US009472204B2

(12) United States Patent
Lee et al.

(10) Patent No.: US 9,472,204 B2
(45) Date of Patent: Oct. 18, 2016

(54) APPARATUS AND METHOD FOR ELIMINATING NOISE, SOUND RECOGNITION APPARATUS USING THE APPARATUS AND VEHICLE EQUIPPED WITH THE SOUND RECOGNITION APPARATUS

(71) Applicant: Hyundai Motor Company, Seoul (KR)

(72) Inventors: Chang-Heon Lee, Gyeonggi-Do (KR); Hyunjin Yoon, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 39 days.

(21) Appl. No.: 14/562,676

(22) Filed: Dec. 6, 2014

(65) Prior Publication Data

US 2016/0078856 A1 Mar. 17, 2016

(30) Foreign Application Priority Data

Sep. 11, 2014 (KR) ........................ 10-2014-0120256

(51) Int. Cl.
*H04B 15/00* (2006.01)
*G10L 21/0232* (2013.01)

(52) U.S. Cl.
CPC .................................. *G10L 21/0232* (2013.01)

(58) Field of Classification Search
CPC ....................... G10L 21/0232; G10L 21/0208
See application file for complete search history.

(56) References Cited

U.S. PATENT DOCUMENTS

2008/0219472 A1* 9/2008 Chhatwal ............ G10L 21/0208
381/94.3

FOREIGN PATENT DOCUMENTS

| | | | |
|---|---|---|---|
| JP | 2004-228937 | A | 8/2004 |
| JP | 2010-185974 | A | 8/2010 |
| KR | 10-2007-0053000 | | 5/2007 |
| KR | 10-2007-0078171 | A | 7/2007 |
| KR | 10-0755182 | B1 | 9/2007 |
| KR | 10-2008-0030140 | A | 4/2008 |
| KR | 2012-0060513 | A | 6/2012 |

OTHER PUBLICATIONS

Korean Office Action for Korean Application No. 10-2014-0120256, English translation, 13 pages.

* cited by examiner

*Primary Examiner* — Simon King
(74) *Attorney, Agent, or Firm* — Mintz Levin Cohn Ferris Glovsky and Popeo, P.C.; Peter F. Corless

(57) ABSTRACT

An apparatus for eliminating noise includes: a gain acquisition unit that determines a gain and a correction value of the gain using a signal to noise ratio (SNR) of an input signal; and a gain application unit that acquires an output signal corresponding to the input signal using the determined gain and the determined correction value, wherein the output signal includes an input signal of which noise is eliminated and an input signal of which noise is not eliminated, and a proportion of the input signal of which noise is eliminated and a proportion of the input signal of which noise is not eliminated are determined according to the determined correction value.

16 Claims, 14 Drawing Sheets

APPARATUS AND METHOD FOR ELIMINATING NOISE, SOUND RECOGNITION APPARATUS USING THE APPARATUS AND VEHICLE EQUIPPED WITH THE SOUND RECOGNITION APPARATUS

CROSS-REFERENCE TO RELATED APPLICATION

This application claims priority to and the benefit of Korean Patent Application No. 10-2014-0120256, filed on Sep. 11, 2014 in the Korean Intellectual Property Office, the disclosure of which is incorporated herein by reference.

BACKGROUND

1. Technical Field

Embodiments of the present disclosure relate to an apparatus and method for eliminating noise, a sound recognition apparatus using the apparatus and a vehicle equipped with the sound recognition apparatus.

2. Description of the Related Art

As is known in the art, a vehicle is a transportation means that can transport an object, such as a human being or cargo, to another position while travelling, e.g., on a road or railroad tracks. A vehicle can move mainly through rotation of one or more wheels installed at a body thereof. Examples of vehicles include three-wheeled and four-wheeled motor vehicles, two-wheeled motor vehicles, such as motorcycles, motorized bicycles, construction machines, bicycles, and trains, which travel on railroad tracks.

A sound recognition apparatus may be installed in a vehicle. The sound recognition apparatus is an apparatus that can recognize a sound generated by speech of a user, e.g., a driver or a passenger. When a sound of the vehicle is recognized by the sound recognition apparatus, a controller inside the vehicle transmits control signals corresponding to the recognized sound to components of the vehicle so that the components can operate according to the sound. When the sound recognition apparatus is used in this way, the user can control the components of the vehicle using sound, thus increasing convenience and safety for the user.

SUMMARY

Therefore, it is an aspect of the present disclosure to provide an apparatus for eliminating noise that is capable of improving a sound recognition rate even when there is much noise, a method of eliminating noise, a sound recognition apparatus using the apparatus and a vehicle equipped with the sound recognition apparatus. It is another aspect of the present disclosure to provide an apparatus for eliminating noise that is capable of improving performance of sound recognition with a relatively small amount of calculation, a method of eliminating noise, a sound recognition apparatus using the apparatus and a vehicle equipped with the sound recognition apparatus. Additional aspects of the present disclosure will be set forth in part in the description which follows and, in part, will be obvious from the description, or may be learned by practice of the disclosure.

In accordance with embodiments of the present disclosure, there is provided an apparatus for eliminating noise, the apparatus including: a gain acquisition unit that determines a gain and a correction value of the gain using a signal to noise ratio (SNR) of an input signal; and a gain application unit that acquires an output signal corresponding to the input signal using the determined gain and the determined correction value, wherein the output signal may include an input signal of which noise is eliminated and an input signal of which noise is not eliminated, and a proportion of the input signal of which noise is eliminated and a proportion of the input signal of which noise is not eliminated may be determined according to the determined correction value.

The gain acquisition unit may determine the correction value of the gain based on the SNR.

The gain acquisition unit may determine the correction value of the gain based further on a set value associated with a relationship between the SNR of the input signal and the correction value, and may change the relationship between the SNR of the input signal and the correction value based on the set value, wherein the set value may indicate a performance of a sound recognition apparatus.

The correction value may be determined in such a way that the correction value increases as the SNR of the input signal increases, or that the correction value has a uniform value when the SNR of the input signal is less than a first value or is greater than a second value.

The correction value may be determined in such a way that the proportion of the input signal of which noise is eliminated increases when the SNR of the input signal increases, while the proportion of the input signal of which noise is not eliminated increases when the SNR of the input signal decreases.

The apparatus may further include a noise component estimation unit that estimates noise of the input signal using at least one of a minima controlled recursive averaging (MCRA) algorithm, an improved minima controlled recursive averaging (IMCRA) algorithm, and a minimum statistics algorithm.

The apparatus may further include a SNR estimation unit that estimates the SNR of the input signal using at least one of a minimum mean square error (MMSE), a root mean square (RMS) error, a cumulative minimum distance (CMD), and a speech presence probability (SPP).

Furthermore, in accordance with embodiments of the present disclosure, there is provided an apparatus for eliminating noise, including: a frequency band division unit that divides an input signal into a signal having a high frequency component and a signal having a low frequency component; a high frequency noise processing unit that eliminates noise of the signal having the high frequency component based on a low resolution analysis algorithm; a low frequency noise processing unit that eliminates noise of the signal having the low frequency component based on a high resolution analysis algorithm; and a synthesis unit that synthesizes a signal processed by the high frequency noise processing unit with a signal processed by the low frequency noise processing unit.

The low frequency noise processing unit may determine a gain and a correction value of the gain using an SNR of the input signal and may acquire an output signal by applying a corrected gain obtained by applying the determined correction value to the determined gain, wherein a proportion of the input signal of which noise is eliminated in the output signal and a proportion of the input signal of which noise is not eliminated in the output signal may be changed according to the determined correction value.

The high frequency noise processing unit may estimate noise from an initial signal of the input signal and may eliminate noise of the signal having the high frequency component using the estimated noise.

Furthermore, in accordance with embodiments of the present disclosure, there is provided a sound recognition apparatus including: an input unit that receives a sound signal in which an original signal and noise are mixed; a conversion unit that converts the sound signal into a signal in a frequency-domain; a gain acquisition unit that determines a gain and a correction value of the gain using an SNR of the sound signal and acquires a corrected gain obtained by applying the determined correction value to the determined gain; a gain application unit that acquires an output signal by applying the corrected gain to the sound signal, wherein a proportion of the input signal of which noise is eliminated in the output signal and a proportion of the input signal of which noise is not eliminated in the output signal are changed according to the determined correction value; and an inverter that inverts the output signal.

Furthermore, in accordance with embodiments of the present disclosure, there is provided a sound recognition apparatus including: an input unit that receives a sound signal in which an original signal and noise are mixed; a frequency band division unit that divides an input signal into a signal having a high frequency component and a signal having a low frequency component; a high frequency noise processing unit that eliminates noise of the signal having the high frequency component based on a low resolution analysis algorithm; a low frequency noise processing unit that eliminates noise of the signal having the low frequency component based on a high resolution analysis algorithm; and a synthesis unit that synthesizes a signal processed by the high frequency noise processing unit with a signal processed by the low frequency noise processing unit.

The high frequency noise processing unit may estimate noise from an initial signal of the input signal and may eliminate noise of the signal having the high frequency component using the estimated noise.

Furthermore, in accordance with embodiments of the present disclosure, there is provided a vehicle including: an input unit that receives a sound signal from a passenger of the vehicle in which sound instructions and noise are mixed together; a sound recognition unit that recognizes sound instructions by: i) converting the received sound signal into a signal in a frequency-domain, ii) determining a gain and a correction value of the gain using a an SNR of the signal in the frequency-domain, iii) acquiring an output signal by applying a corrected gain obtained by applying the determined correction value to the determined gain, and iv) inverting the output signal, wherein a proportion of the received sound signal of which noise is eliminated in the output signal and a proportion of the received sound signal of which noise is not eliminated in the output signal are changed based on the determined correction value; and a controller that generates a control signal based on the recognized sound instructions.

Furthermore, in accordance with embodiments of the present disclosure, there is provided a vehicle including: an input unit that receives a sound signal from a passenger of the vehicle in which sound instructions and noise are mixed together; a frequency band division unit that divides the received sound signal into a signal having a high frequency component and a signal having a low frequency component; a sound recognition unit that: i) eliminates noise of the signal having the high frequency component based on a low resolution analysis algorithm, ii) eliminates noise of the signal having the low frequency component based on a high resolution analysis algorithm, iii) synthesizes the signal having the high frequency component of which noise is eliminated with the signal having the low frequency component of which noise is eliminated, and iv) recognizes sound instructions based on the synthesized signal; and a controller that generates a control signal based on the recognized sound instructions.

Furthermore, in accordance with embodiments of the present disclosure, there is provided a method of eliminating noise, including: determining a gain and a correction value of the gain using an SNR of an input signal; acquiring a corrected gain obtained by applying the determined correction value to the determined gain; and acquiring an output signal by applying the corrected gain to the input signal, wherein a proportion of an input signal of which noise is eliminated in the output signal and a proportion of the input signal of which noise is not eliminated in the output signal are changed based on the determined correction value.

The determining of the correction value of the gain may include determining the correction value of the gain based on a relationship between the SNR of the input signal and the correction value.

The determining of the correction value of the gain may include determining the correction value of the gain based further on using a set value associated with a relationship between the SNR of the input signal and the correction value.

The correction value may be determined in such a way that the correction value increases as the SNR of the input signal increases, or the correction value has a uniform value when the SNR of the input signal is less than a first value or is greater than a second value.

The correction value may be determined in such a way that the proportion of the input signal of which noise is eliminated increases when the SNR of the input signal increases, and the proportion of the input signal of which noise is not eliminated increases when the SNR of the input signal decreases.

The method may further include estimating noise of the input signal using at least one of an MCRA algorithm, an IMCRA algorithm, and a minimum statistics algorithm.

The method may further include estimating the SNR of the input signal using at least one of an MMSE, an RMS error, a CMD, and an SPP.

Furthermore, in accordance with embodiments of the present disclosure, there is provided a method of eliminating noise, including: dividing an input signal into a signal having a high frequency component and a signal having a low frequency component; eliminating noise of the signal having the high frequency component based on a low resolution analysis algorithm; eliminating noise of the signal having the low frequency component based on a high resolution analysis algorithm; and synthesizing the signal having the high frequency component of which noise is eliminated with the signal having the low frequency component of which noise is eliminated.

The eliminating of noise of the signal having the high frequency component may include: determining a gain and a correction value of the gain using an SNR of the input signal; acquiring a corrected gain by applying the determined correction value to the determined gain; and acquiring an output signal by applying the corrected gain to the input signal, wherein a proportion of the input signal of which noise is eliminated in the output signal and a proportion of the input signal of which noise is not eliminated in the output signal are changed based on the determined correction value.

The eliminating of noise of the signal having the low frequency component may include estimating noise from an initial signal of the input signal and eliminating noise of the signal having the high frequency component using the estimated noise.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
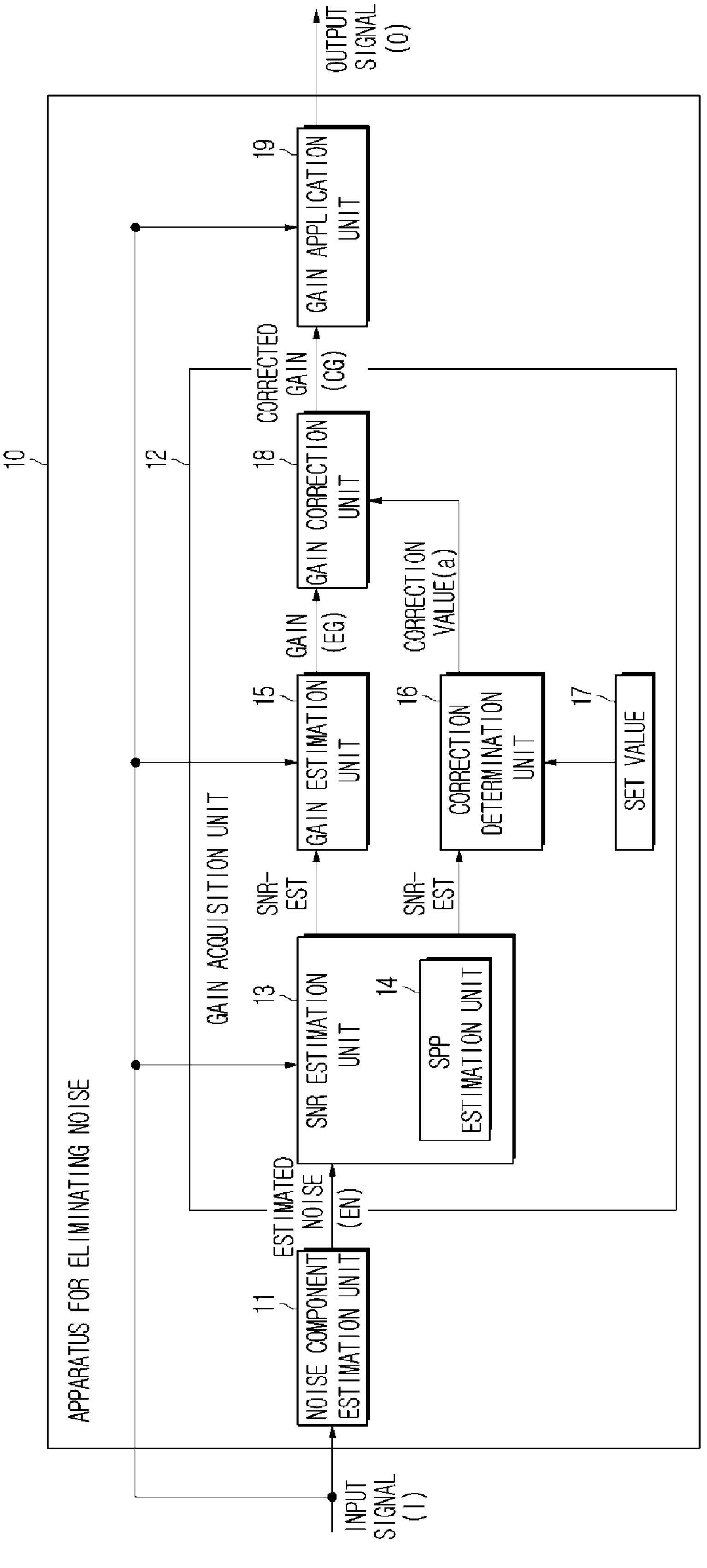
FIG. 1 is a block diagram of an apparatus for eliminating noise according to embodiments of the present disclosure.

Reference will now be made in detail to the embodiments of the present disclosure, examples of which are illustrated in the accompanying drawings, wherein like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the control unit, whereby the apparatus is known in the art to be suitable for eliminating noise and/or embodying a sound recognition apparatus.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, a plurality of elements are distinguished from a single element so as to explain an apparatus and method of eliminating noise, a sound recognition apparatus using the apparatus and a vehicle equipped with the sound recognition apparatus. However, elements to be described are distinguished for convenience of explanation, and such classification does not mean that the elements should be physically separated from each other. Furthermore, the elements to be described may be subdivided or combined.

Hereinafter, an apparatus for eliminating noise will be described with reference to FIGS. 1 through 7.

Figure 2:
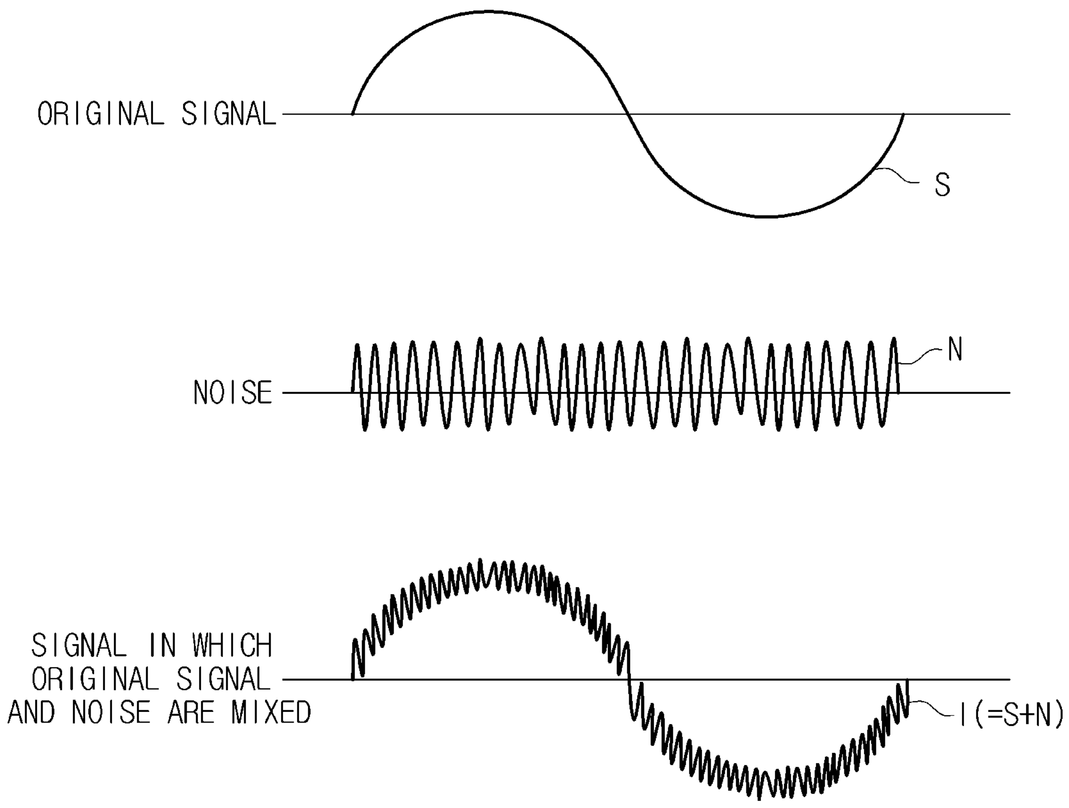
FIG. 2 illustrates an example of waveforms of signals having noise.

FIG. 1 is a block diagram of an apparatus for eliminating noise according to embodiments of the present disclosure, and FIG. 2 illustrates an example of waveforms of signals having noise.

According to embodiments of the present disclosure shown in FIG. 1, an apparatus 10 for eliminating noise may include a noise component estimation unit 11, a gain acquisition unit 12, and a gain application unit 19. Referring to FIGS. 1 and 2, the apparatus 10 for eliminating noise may receive an input signal I (I=S+N) in which an original signal and noise N are mixed from an external device such as a microphone, and may output signals O in which noise N is eliminated or attenuated from the received input signal I using the noise component estimation unit 11, the gain acquisition unit 12, and the gain application unit 19.

The noise component estimation unit 11 of the apparatus 10 for eliminating noise may receive the input signal I in which the original signal S and the noise N are mixed from the external device and may acquire estimated noise (EN) from the input signal I in which the original signal S and the noise N are mixed. In detail, the noise component estimation unit 11 may estimate only the EN from among frequency components of the input signal I.

The noise component estimation unit 11 may estimate a noise component from the input signal I using various algorithms that may be considered by one of ordinary skill in the art. For example, the noise component estimation unit 11 may acquire the EN from the input signal I using various algorithms, such as a minima controlled recursive averaging (MCRA) algorithm, an improved minima controlled recursive averaging (IMCRA) algorithm, and a minimum statistics algorithm. In addition, the noise component estimation unit 11 may use various mathematical or statistical algorithms for estimating a noise signal from the input signal I. In embodiments, the noise component estimation unit 11 may also estimate the noise component using a speech presence probability (SPP) regarding whether a frequency component is close to the sound. For example, the noise component estimation unit 11 may also estimate the noise using the SPP in the MCRA algorithm.

In embodiments, the noise component estimation unit 11 may also divide the input signal I into a plurality of bands and then may separately estimate the noise component in each of the divided plurality of bands. Also, in embodiments, the noise component estimation unit 11 may also estimate the noise component from the entire input signal I.

The EN acquired by the noise component estimation unit 11 may be transmitted to the gain acquisition unit 12.

The gain acquisition unit 12 may acquire a gain G to be applied to the input signal I using the EN. In embodiments, the gain acquisition unit 12 may separately acquire the gain G in each of the divided bands of the input signal I. Further, in embodiments, the gain acquisition unit 12 may also acquire the gain G by calculating the gain G from the entire input signal I.

In embodiments shown in FIG. 1, the gain acquisition unit 12 may include a signal to noise ratio (SNR) estimation unit 13, a gain estimation unit 15, a correction value determination unit 16, and a gain correction unit 18.

The SNR estimation unit 13 may receive the acquired EN from the noise component estimation unit 11 and may estimate the SNR using the received EN. Here, the SNR estimation unit 13 may receive the EN and the input signal I from the noise component estimation unit 11 and the external device and may estimate the SNR using the received EN and input signal I.

The SNR may be defined using the following Equation 1, for example. Hereinafter, the SNR defined as in Equation 1 will be described. However, the SNR is not limited to being defined as in Equation 1 but may be defined differently according to a designer.

$$SNR = c\log\left(\frac{S^2}{N^2}\right) \qquad \text{[Equation 1]}$$

S is an original signal with which noise N is not synthesized, N is noise, and SNR is an SNR. c is a constant that may be applied according to the user's selection. Here, N may be estimated noise (EN) that is estimated by the noise component estimation unit 11. When the SNR is defined in this way, if there is much noise N in the original signal S, the SNR may have a relatively small value, and if there is less noise N in the original signal S, the SNR may have a relatively larger value.

When the SNR is defined in this way, the original signal S with which the noise N is not synthesized should first be acquired. Thus, the SNR estimation unit 13 may acquire the EN estimated by the noise component estimation unit 11 and SNR SNR_EST estimated using the following Equation 2 and may substitute for an original SNR.

$$SNR_{EST} = c\log\left(\frac{I^2}{N^2}\right), \text{ wherein } I = S + N \qquad \text{[Equation 2]}$$

I is an input signal in which the above-described original signal S and the noise N are mixed, and SNR_EST is an estimated SNR.

The SNR estimation unit 13 may acquire the estimated SNR SNR_EST using the above-described Equation 2.

In embodiments, the SNR estimation unit 13 may estimate the SNR by using a minimum mean square error (MMSE) in which a mean square error (MSE) is minimized, may estimate the SNR using a root mean square (RMS) error, or may estimate the SNR using a cumulative minimum distance (CMD).

In embodiments, the SNR estimation unit 13 may acquire the SPP or may estimate the SNR using the acquired SPP. To this end, the SNR estimation unit 13 may further include an SPP estimation unit 14 that calculates and estimates an SPP. The SPP estimation unit 14 may estimate and acquire the SPP using various methods that may be considered by one of ordinary skill in the art. When the SPP is estimated by the SPP estimation unit 14, the SNR estimation unit 13 may correct the estimated SNR SNR_EST based on the SPP. The SPP estimation unit 14 may be omitted depending on the embodiments.

The estimated SNR SNR_EST acquired by the SNR estimation unit 13 may be transmitted to the gain estimation unit 15 and the correction value determination unit 16. Also, the SPP acquired by the SPP estimation unit 14 of the SNR estimation unit 13 may be transmitted to the gain estimation unit 15.

The gain estimation unit 15 may calculate and estimate a gain EG using the estimated SNR SNR_EST. In embodiments, the gain estimation unit 15 may also calculate and estimate the EG by further using the transmitted SPP as well as the estimated SNR SNR_EST.

The gain estimation unit 15 may also estimate the gain EG using a minimum mean-square error-short time spectral amplitude (MMSE-STSA) estimator, a minimum mean square error-log spectral amplitude (MMSE-LSA) estimator, or an optimally modified-log spectral amplitude (OM-LSA) estimator depending on the embodiments. In addition, the gain estimation unit 15 may also estimate the gain EG using various methods that may be considered by one of ordinary skill in the art.

The correction value determination unit 16 may determine a correction value $\alpha$ for correcting the estimated gain EG. In detail, the correction value determination unit 16 may determine the correction value $\alpha$ using the SNR. The SNR used in the correction value determination unit 16 may include the estimated SNR SNR_EST transmitted from the SNR estimation unit 13. Hereinafter, both the SNR and the estimated SNR SNR_EST may be referred to as an SNR SNR_EST.

Figure 3:
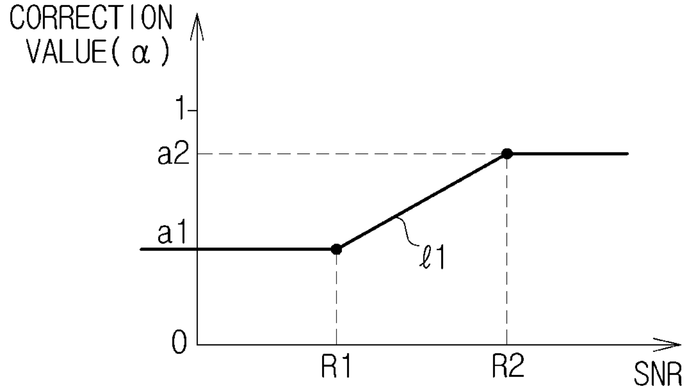
FIGS. 3 through 5 are graphs showing the relationship between a correction value and a signal to noise ratio (SNR)
Figure 4:
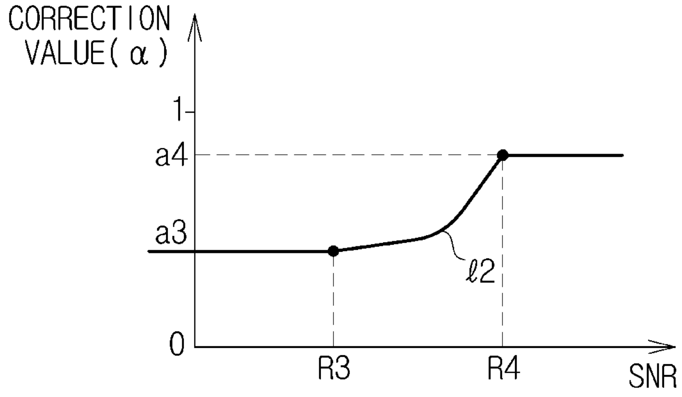
Figure 5:
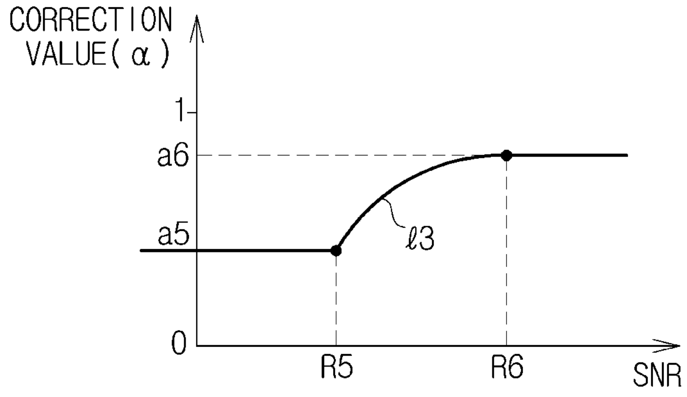

FIGS. 3 through 5 are graphs showing the relationship between a correction value and an SNR. In FIGS. 3 through 5, the x-axis represents an SNR SNR_EST, and the y-axis represents a correction value $\alpha$ for correcting the estimated gain EG. The correction value $\alpha$ may be a particular value in the range from 0 to 1. In FIGS. 3 through 5, the correction value $\alpha$ that corresponds to each of points a1 through a6 of the y-axis is a value that is greater than 0 and less than 1. In FIGS. 3 through 5, the correction value $\alpha$ does not have a value of 0. However, the correction value $\alpha$ may also be 0 depending on the embodiments. Also, the correction value $\alpha$ does not have a value of 1. However, the correction value $\alpha$ may also be 1 depending on the embodiments.

Referring to FIG. 3, when the SNR SNR_EST is less than a predetermined first SNR R1, the correction value determination unit 16 may determine a uniform lower limit value a1 as the correction value $\alpha$ for correcting the estimated gain EG. In other words, the correction value $\alpha$ with respect to the SNR SNR_EST that is less than the first SNR R1 may be uniform.

Also, when the SNR SNR_EST is greater than a predetermined second SNR R2, the correction value determination unit 16 may determine a uniform upper limit value a2 as the correction value α for correcting the estimated gain EG. In other words, when the SNR SNR_EST is greater than the second SNR R2, the correction value α may be uniform. When the SNR SNR_EST is greater than the second SNR R2, it may mean that less noise N is present in the input signal I. Thus, the correction value α may be determined as 1 or a value that is close to 1.

Referring to FIG. 3, when the SNR SNR_EST is between the first SNR R1 and the second SNR R2, the correction value determination unit 16 may determine the correction value α in proportion to a value of the SNR SNR_EST. In other words, the SNR, SNR_EST and the correction value α may have a linear relationship I1 in the range of a first value R1 and a second value R2. Here, the correction value α may have a value in the range from the lower limit value a1 and the upper limit value a2.

Referring to FIG. 4, when the SNR SNR_EST is less than a third SNR R3, the correction value determination unit 16 may determine a uniform lower limit value a3 as the correction value α for correcting the estimated gain EG, and when the SNR SNR_EST is greater than a predetermined fourth SNR R4, the correction value determination unit 16 may determine a uniform upper limit value a4 as the correction value α for correcting the estimated gain EG. When the SNR SNR_EST is between the third SNR R3 and the fourth SNR R4, the correction value determination unit 16 may determine the correction value α by applying the SNR SNR_EST to a predetermined exponential function I2.

Also, referring to FIG. 5, when the SNR SNR_EST is less than a fifth SNR R5, the correction value determination unit 16 may determine a uniform lower limit value a5 as the correction value α, and when the SNR SNR_EST is greater than a sixth SNR R6, the correction value determination unit 16 may determine an upper limit value a6 as the correction value α, and when the SNR SNR_EST is between the fifth SNR R5 and the sixth SNR R6, the correction value determination unit 16 may also determine the correction value α by applying the SNR SNR_EST to a predetermined log function I3.

In addition, the correction value determination unit 16 may determine the correction value α for correcting the estimated gain EG using various relationships between the SNR SNR_EST and the correction value α.

The above-described upper limit value a1, a3 or a5 and the above-described lower limit value a2, a4 or a6 may be arbitrarily determined by a designer of the apparatus 10 for eliminating noise or a user who uses the apparatus 10 for eliminating noise. The upper limit value a1, a3 or a5 and the lower limit value a2, a4 or a6 may also be fixed values. In addition, the upper limit value a1, a3 or a5 and the lower limit value a2, a4 or a6 may be variable values depending on the embodiments. In other words, the designer or the user may change the upper limit value a1, a3 or a5 and the lower limit value a2, a4 or a6, thereby changing the correction value α determined according to the SNR SNR_EST.

In embodiments, the correction value determination unit 16 may determine the correction value α by further using the SNR SNR_EST and a separately input set value 17. In this case, the correction value determination unit 16 may first determine the relationship between the SNR SNR_EST and the correction value α according to the set value 17 and subsequently may determine the correction value α by applying the input SNR SNR_EST to the relationship between the above-described SNR SNR_EST and the correction value α.

The set value 17 may refer to a value that indicates a selectable situation. Thus, the number of selectable set values 17 may correspond to the number of selectable situations. The set value 17 may be a value that indicates settings or performance of a sound recognition apparatus to which the apparatus 10 for eliminating noise may be applied. For example, the set value 17 may be a value that indicates the sound recognition apparatus that indicates whether noise is further eliminated or is not eliminated from an output signal o by further using another apparatus for eliminating noise.

The correction value determination unit 16 may change the relationship between the correction value and the SNR according to the set value 17. For example, the correction value determination unit 16 may also change a function regarding the relationship between the correction value and the SNR according to the set value 17 and may also change a lower limit value a1, a3 or a5 or an upper limit value a2, a4 or a6 of the correction value α according to the set value 17. In other words, the correction value determination unit 16 may acquire various correction values α that are appropriate for several situations according to the set value 17.

In detail, for example, if the set value 17 that indicates a sound recognition apparatus that further uses another apparatus for eliminating noise is input to the correction value determination unit 16, the correction value determination unit 16 may acquire the correction value α after changing the above-described lower limit value a1, a3 or a5 to be relatively smaller according to the input set value 17. If there is much noise N in the input signal I, the SNR SNR_EST is low and the output signal o is transmitted to the sound recognition apparatus that further uses another apparatus for eliminating noise, the correction value α may have a relatively small value. Thus, as will be described later, the proportion of an original input signal I that is not distorted in the output signal o is increased. If the proportion of the original input signal that is not distorted increases, the proportion of an original signal that is not distorted in the input signal I increases so that more original signals may be output without distortion. Thus, an error of sound recognition of the sound recognition apparatus may be reduced.

If the set value 17 that indicates the sound recognition apparatus that does not further use another apparatus for eliminating noise is input to the correction value determination unit 16, the correction value determination unit 16 may acquire the correction value α after changing the above-described lower limit value a1, a3 or a5 to be relatively smaller according to the input set value 17.

The set value 17 may be stored in a separate storage apparatus, such as a semiconductor storage apparatus or a magnetic disk storage apparatus. The correction value determination unit 16 may determine the relationship between the SNR SNR_EST and the correction value α by calling the set value 17 from the separate storage apparatus.

The gain correction unit 18 may correct the gain EG transmitted by the gain estimation unit 15 using the correction value α determined by the correction value determination unit 16 and may output the corrected gain CG. The gain correction unit 18 may correct the gain using the following Equation 3.

$$cG=a(\mathrm{SNR},T)*G+(1.0-a(\mathrm{SNR},T)) \quad \text{[Equation 3]}$$

cG is a corrected gain, SNR is an SNR SNR_EST, T is a set value, and a(SNR, T) is a correction value α determined by the SNR SNR_EST and the set value T. G is a gain EG estimated by the gain estimation unit 15. According to Equation 3, when the correction value α is 1 or a value that is close to 1, the corrected gain cG output from the gain correction unit 18 will be the same as or similar to the gain EG estimated by the gain estimation unit 15. If the correction value α is 0 or a value that is close to 0, the corrected gain cG output from the gain correction unit 18 may be 1 or a value that is close to 1.

The gain application unit 19 may acquire the output signal o using the corrected gain CG by the gain correction unit 18 and the input signal I. The gain application unit 19 may generate the output signal o to which the gain is applied, using the following Equation 4.

$$O=cG*I=[a*G+(1.0-a)]*I=a*G*I+(1.0-a)*I \quad \text{[Equation 4]}$$

o is an output signal and cG is a corrected gain. α is a corrected value, and G is an estimated gain EG. The correction value α may be determined by the SNR SNR_EST and the set value T. Here, a*G*I at a side farthest to the right is a proportion of the input signal from which the noise N corrected by the estimated gain EG is eliminated, and (1.0−a)*I is a proportion of the original input signal I that is not distorted.

According to Equation 4, the proportion of the input signal from which the noise N is eliminated, and the proportion of the original input signal I may be determined according to the size of the correction value α. If the correction value α is 1 or a value that is close to 1, the input signal from which the noise N is eliminated will be output as the output signal o from the gain application unit 19. If the correction value α is 0 or a value that is close to 0, the original input signal I that is not distorted will be output as the output signal o from the gain application unit 19.

Referring to FIGS. 3 through 5, the correction value α may be determined according to the SNR SNR_EST and the set value 17. Thus, the proportion of the input signal from which the noise N is eliminated and the proportion of the original input signal I may be determined according to the SNR SNR_EST or the set value 17. In more detail, the proportion of the input signal from which the noise N is eliminated, and the proportion of the original input signal I may be determined depending on whether there is much noise N in the input signal I or according to settings or performance of the sound recognition apparatus to which the apparatus 10 for eliminating noise.

If there is less noise N in the input signal I and the SNR SNR_EST is large, the correction value α may be determined as a value that is close to the upper limit value a2, a4 or a6. In this case, the correction value α may also be determined as 1 or a value that is close to 1. Then, since the correction value α is increased, the proportion of the input signal from which the noise N is eliminated in the output signal o is relatively increased, and the proportion of the original input signal I that is not distorted is relatively decreased. If the SNR SNR_EST is large, the input signal to which the estimated gain EG is applied is a signal from which the noise N is eliminated and which is hardly distorted, and the proportion of the input signal from which the noise N is eliminated increases, so that distortion of the input signal I may be minimized and the optimized output signal o may be obtained.

When there is much noise N in the input signal I and the SNR SNR_EST is small, the correction value α may be determined as a value that is close to the lower limit value a1, a3 or a5. In this case, since the correction value α decreases, the proportion of the input signal from which the noise N is eliminated in the output signal o will be relatively decreased, and the proportion of the original input signal I that is not distorted will be relatively increased. If the SNR SNR_EST is small, much noise N of the input signal to which the estimated gain EG is applied is eliminated so that distortion of a sound signal increases. Thus, the proportion of the original input signal I that is not distorted increases so that the output signal o in which distortion is minimized may be obtained.

If the correction value α is not applied to the estimated gain EG, there is much noise N in the input signal I and the SNR SNR_EST is small, only the input signal from which the noise N is eliminated is output as the output signal o so that distortion of the input signal I may be increased.

However, as described above, if an appropriate correction value α is applied according to the SNR SNR_EST or settings or performance of the sound recognition apparatus, distortion of the input signal I may be minimized, and the optimized output signal o may be obtained.

The noise component estimation unit 11, the gain acquisition unit 12 and the gain application unit 19 described above may be performed by separate processors that are physically separated from each other or using one processor. The processor may be programmed to perform a function of the noise component estimation unit 11, the gain acquisition unit 12 or the gain application unit 19. The processor may be implemented by one or two or more semiconductors.

Figure 6:
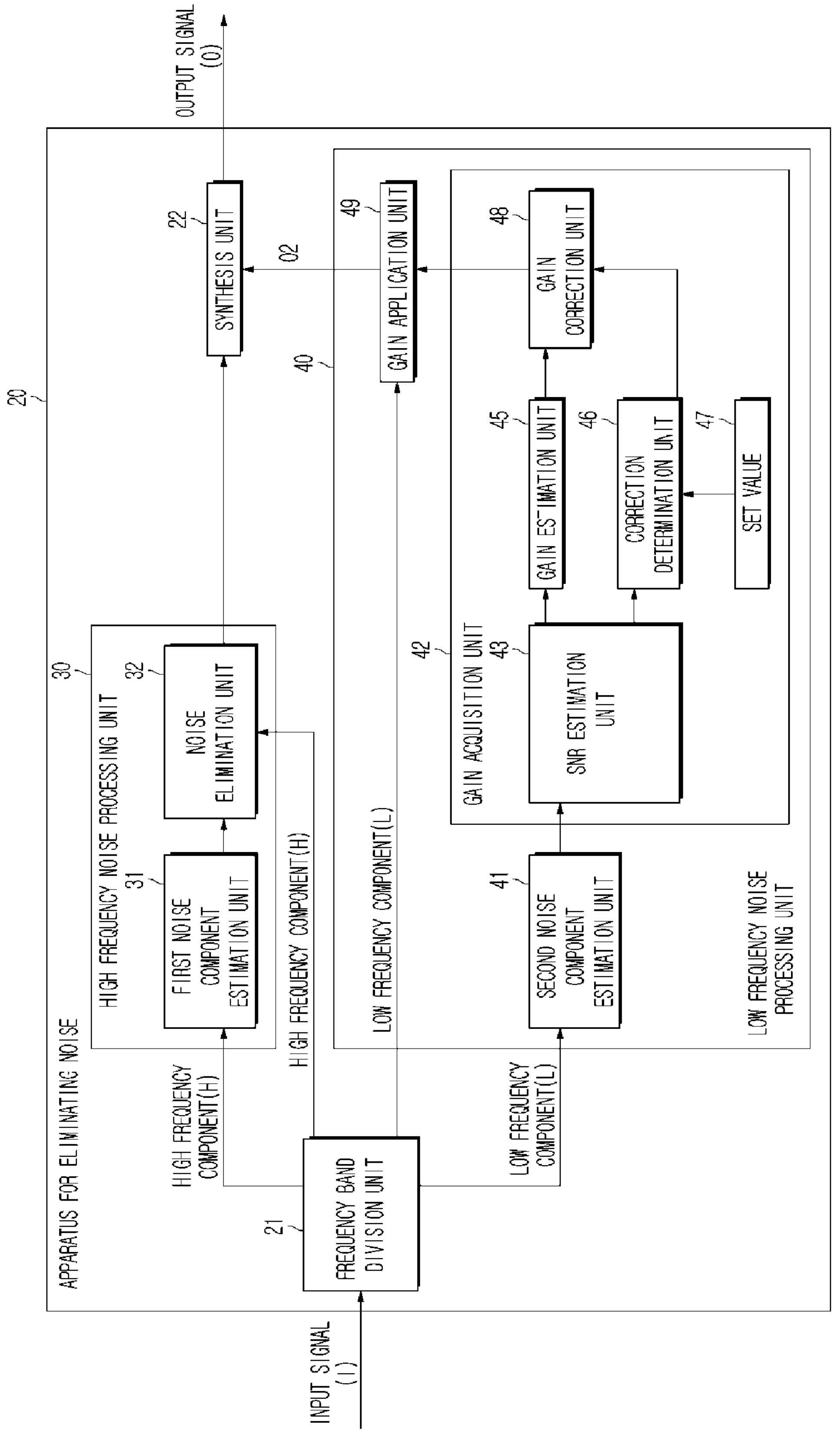
FIG. 6 is a block diagram of an apparatus for eliminating noise according to embodiments of the present disclosure.
Figure 7:
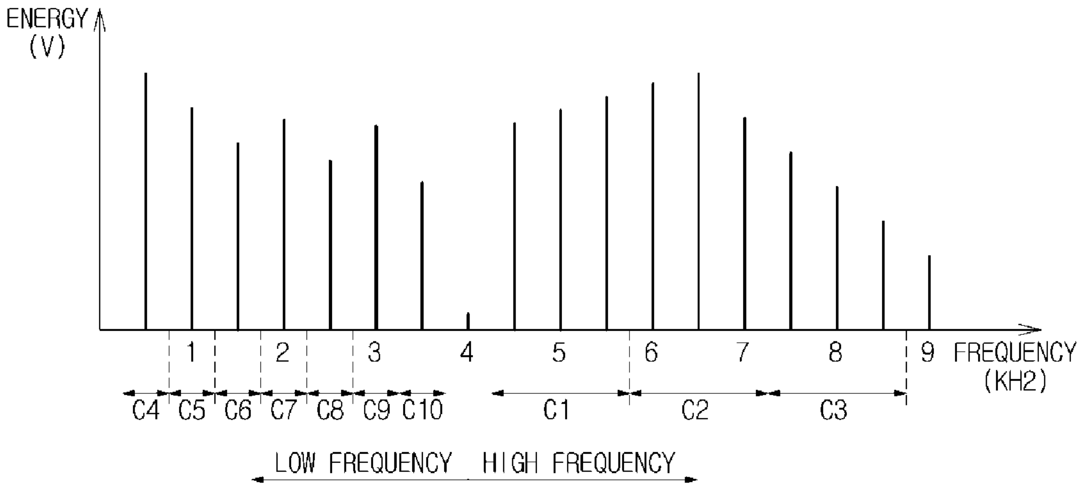
FIG. 7 is a graph for explaining high resolution analysis and low resolution analysis of frequencies.

FIG. 6 is a block diagram of an apparatus for eliminating noise according to embodiments of the present disclosure, and FIG. 7 is a view for explaining a high resolution analysis algorithm and a low resolution analysis algorithm of frequencies.

As illustrated in FIG. 6, an apparatus 20 for eliminating noise may include a frequency band division unit 21, a synthesis unit 22, a high frequency noise processing unit 30, and a low frequency noise processing unit 40. In detail, the apparatus 20 for eliminating noise according to embodiments of the present disclosure may classify an input signal I according to frequency band and then may eliminate noise N by applying different methods in each frequency band.

The frequency band division unit 21 may divide the input signal I into a signal H having a high frequency component and a signal L having a low frequency component. The input signal I may be divided into the signal H having the high frequency component and the signal L having the low frequency component. The frequency band division unit 21 may divide the input signal I into the signal H having the high frequency component and the signal L having the low frequency component using a predetermined reference value. For example, as illustrated in FIG. 7, the predetermined reference value may include 4 kHz. In this case, the frequency band division unit 21 may divide a component of a frequency less than 4 kHz into the signal L having the low frequency component and a component of a frequency more than 4 kHz into the signal H having the high frequency component. In this way, the predetermined reference value may be arbitrarily determined according to the designer's or the user's selection.

The signal H having the high frequency component may be transmitted to a high frequency noise processing unit 30, and the signal L having the low frequency component may be transmitted to a low frequency noise processing unit 40.

The high frequency noise processing unit 30 and the low frequency noise processing unit 40 may eliminate noise of a signal having a high frequency component and noise of a signal having a low frequency component in the same manner or using different methods. For example, both the high frequency noise processing unit 30 and the low frequency noise processing unit 40 may eliminate noise using a method performed by the high frequency noise processing unit 30 that will be described later or a method performed by the low frequency noise processing unit 40 that will be described later. Hereinafter, embodiments in which the high frequency noise processing unit 30 and the low frequency noise processing unit 40 eliminate noise using different methods will be described. However, this does not mean that the high frequency noise processing unit 30 and the low frequency noise processing unit 40 can eliminate noise only according to the embodiments.

The high frequency noise processing unit 30 may eliminate noise N of a signal H having a high frequency component. In embodiments, the high frequency noise processing unit 30 may eliminate the noise N according to a low resolution analysis algorithm. Referring to FIG. 7, the low resolution analysis algorithm may be an algorithm that is set to divide a high frequency component into a plurality of frequency bands c1 through c3 of which each bandwidth becomes relatively wide and to eliminate the noise N in each of the plurality of divided frequency bands c1 through c3.

The high frequency noise processing unit 30 may include a first noise component estimation unit 31 and a noise elimination unit 32.

The first noise component estimation unit 31 may estimate only a noise component from the signal H having the high frequency component transmitted from the frequency band division unit 21 in each of the relatively wide frequency bands c1 through c3. The first noise component estimation unit 31 may estimate the noise component from the signal H having the high frequency component using various algorithms that may be considered by one of ordinary skill in the art. The first noise component estimation unit 31 may estimate the noise N using an initial signal having no original signal, such as a sound, i.e., the noise N, or an initial signal of which the main component is the noise N. The first noise component estimation unit 31 may estimate and determine the initial signal as noise. In this case, the first noise component estimation unit 31 may calculate an average energy level from the initial signal for a predetermined period and may estimate the calculated average energy level as the noise N.

The noise elimination unit 32 may eliminate the noise N in each of the frequency bands c1 through c3 of the signal H having the high frequency component transmitted from the frequency band division unit 21. The noise elimination unit 32 may eliminate the noise N from the input signal I by eliminating the initial signal estimated as the noise N from the input signal I. The noise elimination unit 32 may eliminate the noise N by eliminating the estimated noise of the average energy level calculated from the initial signal from the signal H having the high frequency component. The noise elimination unit 32 may eliminate the noise N from the signal H having the high frequency component using various algorithms. For example, the noise elimination unit 32 may eliminate the noise N from the signal H having the high frequency component using spectral subtraction or a Wiener filter.

A signal o1 of which noise is eliminated by the high frequency noise processing unit 30, may be transmitted to the synthesis unit 22 and may be synthesized with a signal o2, of which noise transmitted from the low frequency noise processing unit 40 is eliminated.

The low frequency noise processing unit 40 may eliminate the noise N of the signal L having the low frequency component. In embodiments, the low frequency noise processing unit 40 may eliminate the noise N according to the high resolution analysis algorithm. Referring to FIG. 7, the low frequency noise processing unit 40 may divide the low frequency component into a plurality of frequency bands c4 through c10 of which each bandwidth becomes relatively narrow, according to the high resolution analysis algorithm and then may eliminate the noise N in each of the plurality of frequency bands c4 through c10. In other words, the low frequency noise processing unit 40 may divide the frequency component into a plurality of frequency bands having a relatively larger number than that of high frequency noise processing units 30 and may eliminate the noise N in each of the plurality of divided frequency bands c4 through c10.

The low frequency noise processing unit 40 may include a second noise component estimation unit 41, a gain acquisition unit 42, and a gain application unit 49.

The second noise component estimation unit 41 may estimate only a noise component from among frequency components of the signal L having the low frequency component. Here, the second noise component estimation unit 41 may estimate the noise component in each band. The second noise component estimation unit 41 may estimate the noise component from the signal L having the low frequency component using various algorithms that may be considered by one of ordinary skill in the art, such as an MCRA algorithm, an IMCRA algorithm, and a minimum statistics algorithm. In addition, the second noise component estimation unit 41 may estimate the noise component from the signal L having the low frequency component using various mathematical or statistical algorithms for estimating the noise signal. Also, the second noise component estimation unit 41 may estimate the noise component using an SPP regarding whether the frequency component is close to the sound.

The gain acquisition unit 42 may acquire a gain to be applied to the signal L having the low frequency component using estimated noise. In embodiments shown in FIG. 1, the gain acquisition unit 42 may include an SNR estimation unit 43, a gain estimation unit 45, a correction value determination unit 46, and a gain correction unit 48.

The SNR estimation unit 43 may acquire an estimated SNR using the estimated noise acquired by the second noise component estimation unit 41. The SNR estimation unit 43 of FIG. 6 may be the same as the SNR estimation unit 13 illustrated in FIG. 1.

In embodiments, the SNR estimation unit 43 may use an MMSE, an RMS error, or a CMD so as to estimate the SNR. Also, the SNR estimation unit 43 may acquire the SPP or may estimate the SNR using the acquired SPP.

The gain estimation unit 45 may calculate and estimate a gain using the estimated SNR. In embodiments, the gain estimation unit 45 may also calculate and estimate by further using the estimated SNR and the SPP.

The gain estimation unit 45 may use a MMSE-STSA estimator, a MMSE-LSA estimator, or an OD-LSA estimator so as to estimate the gain, depending on the embodiments. In addition, the gain estimation unit 15 may use various methods that may be considered by one of ordinary skill in the art so as to estimate the gain.

The correction value determination unit 46 may determine a correction value for correcting the estimated gain using the SNR. Here, the SNR may include the estimated SNR transmitted from the SNR estimation unit 43. The correction value determination unit 46 may determine the correction value using only the SNR or using both the SNR and a set value 47.

The correction value determination unit 46 may determine the correction value using the relationship between the correction value and the SNR that have been described with reference to FIGS. 3 through 5. As illustrated in FIGS. 3 through 5, if the acquired SNR is less than a predetermined value R1, R3 or R5 or greater than a predetermined value R2, R4 or R6, correction values a1 through a6 may be uniform. The correction value and the SNR may have the relationship of a linear function I1, an exponential function I2 or a log function I3 in the range from the predetermined values R1 and R2, R3 and R4, or R5 and R6. In addition, the correction value determination unit 46 may determine the correction value for correcting the estimated gain using various relationships between the SNR and the correction value.

Also, the correction value determination unit 46 may determine the correction value by further using the set value 47. In this case, the correction value determination unit 16 may first determine the relationship between the SNR and the correction value to be used according to the set value 47, and may subsequently determine the correction value using the relationship between the SNR and the correction value, as described above. Here, the set value 47 may be the same as the set value 17 described with reference to FIG. 1. In detail, the set value 47 may refer to a value that indicates a selectable situation and may also include a value that indicates settings or performance of a sound recognition apparatus to which the apparatus 10 for eliminating noise may be applied. The relationship between the correction value and the SNR may be changed according to the set value 47. In this case, a function regarding the relationship between the correction value and the SNR may be changed according to the set value 47, and a lower limit value a1, a3 or a5 or an upper limit value a2, a4 or a6 of the relationship between the correction value and the SNR illustrated in FIGS. 3 through 5 may be changed according to the set value 47.

The gain correction unit 48 may correct and output the gain transmitted by the gain estimation unit 45 using the correction value determined by the correction value determination unit 46. The gain correction unit 18 may correct the gain using the above-described Equation 3.

The gain application unit 49 may acquire the signal o2 to be transmitted to the synthesis unit 22 using the gain corrected by the gain correction unit 48 and the signal L having the low frequency component. The gain application unit 49 may generate the signal o2 to be transmitted to the synthesis unit 22 to which the gain is applied using the above-described Equation 4. Thus, the signal o2 output from the gain application unit 49 may be a signal having a high proportion of the signal L having the low frequency component or a signal having a high proportion of the signal of which noise is eliminated from the signal L having the low frequency component according to the correction value. The signal output from the gain application unit 49 may be transmitted to the synthesis unit 22.

The synthesis unit 22 may synthesize the signal o1 output from the high frequency noise processing unit 30 with the signal o2 output from the low frequency noise processing unit 40 and may acquire the output signal o. The output signal o may be a signal of which noise N is eliminated using different methods depending on whether the output signal o has a high frequency or a low frequency.

The frequency band division unit 21, the high frequency noise processing unit 30, the low frequency noise processing unit 40, and the synthesis unit 22 of the apparatus 20 for eliminating noise described above may be performed using separate processors that are physically separated from each other or using one processor. The processor may be programmed to perform a function of the frequency band division unit 21, the high frequency noise processing unit 30, the low frequency noise processing unit 40 or the synthesis unit 22. The processor may be implemented by one or two or more semiconductors.

Hereinafter, a sound recognition apparatus that uses an apparatus for eliminating noise will be described with reference to FIGS. 8 and 9.

Figure 8:
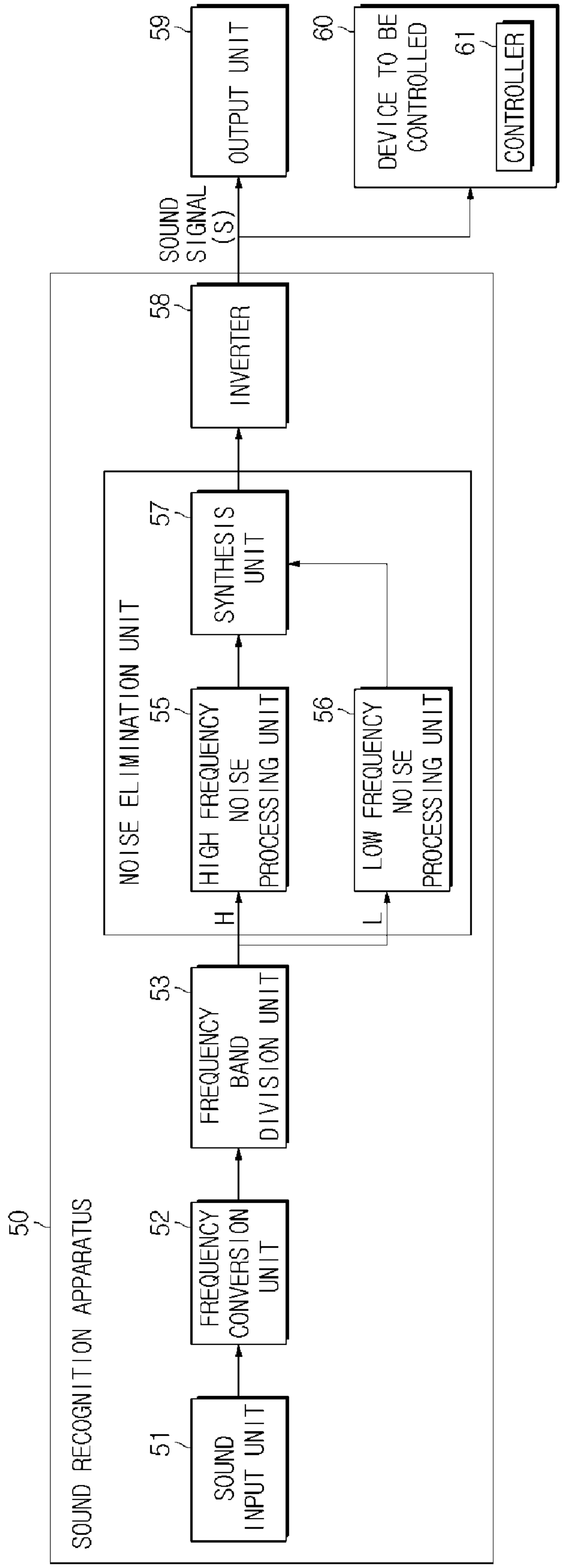
FIG. 8 is a block diagram of a sound recognition apparatus according to embodiments of the present disclosure.

FIG. 8 is a block diagram of a sound recognition apparatus according to embodiments of the present disclosure.

Referring to FIG. 8, a sound recognition apparatus 50 may include a sound input unit 51, a frequency conversion unit 52, a frequency band division unit 53, a noise elimination unit 54, and an inverter 58.

The sound input unit 51 may receive a voice or sound that is a wave generated when a human being speaks or an object vibrates. The sound input unit 51 may generate and output an electrical signal corresponding to a frequency of the voice or sound by vibrating according to the frequency of the voice or sound. Here, the generated electrical signal may include an analog signal. Also, the generated electrical signal may be a signal in a time-domain. The electrical signal output from the sound input unit 51 may be transmitted to the frequency conversion unit 52. If necessary, the electrical signal output from the sound input unit 51 may be transmitted to the frequency conversion unit 52 using an amplifier or an analog-to-digital (A/D) converter.

Figure 9:
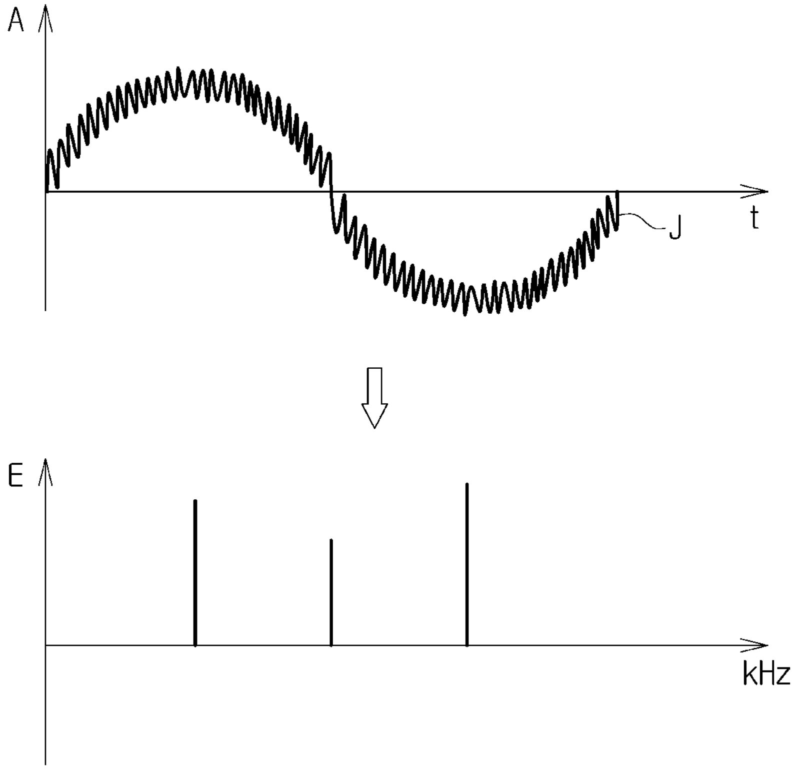
FIG. 9 is a graph showing frequency conversion using a frequency conversion unit.

FIG. 9 is a graph showing frequency conversion using a frequency conversion unit.

As illustrated in FIG. 9, the frequency conversion unit 52 may convert an input signal J in the time-domain into signals f1 through f3 in a frequency-domain. The frequency conversion unit 52 may convert the signal J in the time-domain into the signals f1 through f3 using a fast Fourier transform (FFT). The frequency conversion unit 52 may also be omitted depending on the embodiments.

The frequency band division unit 53 may divide the signals f1 through f3 in the frequency-domain into a signal H having a high frequency component and a signal L having a low frequency component, may transmit the signal H having the high frequency component to a high frequency noise processing unit 55 of the noise elimination unit 54, and may transmit the signal L having the low frequency component to a low frequency noise processing unit 56 of the noise elimination unit 54. The frequency band division unit 53 may also be omitted depending on the embodiments.

The noise elimination unit 54 may include the high frequency noise processing unit 55, the low frequency noise processing unit 56, and the synthesis unit 57. The noise elimination unit 54 may be the noise elimination apparatus 10 shown in FIG. 1, depending on the embodiments. In this case, the high frequency noise processing unit 55 and the synthesis unit 57 may be omitted from the noise elimination unit 54, and the low frequency noise processing unit 56 may process both the signal H having the high frequency component and the signal L having the low frequency component.

The high frequency noise processing unit 55 may eliminate noise N of a signal H having a high frequency component and may transmit a signal o1 from which the noise N is eliminated to the synthesis unit 57. In the embodiments, the high frequency noise processing unit 55 may eliminate the noise N of the signal H having the high frequency component according to the low resolution analysis algorithm, as illustrated in FIG. 7. In this case, the high frequency noise processing unit 55 may estimate a noise component from the signal H having the high frequency component transmitted from the frequency band division unit 53 and may eliminate noise estimated in each of the frequency bands c1 through c3 of the signal H having the high frequency component. The high frequency noise processing unit 55 may estimate noise by calculating an average energy level from an initial signal and may eliminate the noise N from the signal H having the high frequency component according to the result of estimation. The high frequency noise processing unit 55 may use spectral subtraction or a Wiener filter so as to eliminate the noise N.

The low frequency noise processing unit 56 may eliminate the noise N of the signal L having the low frequency component and may transmit a signal o2 from which the noise N is eliminated to the synthesis unit 57. In embodiments, the low frequency noise processing unit 56 may eliminate the noise N of the signal L having the low frequency component according to the high resolution analysis algorithm, as illustrated in FIG. 7. The low frequency noise processing unit 56 may eliminate the noise N using the noise component estimation unit 11 or 41, the gain acquisition unit 12 or 42, and the gain application unit 19 or 49 that have been described with reference to FIGS. 1 and 6. The noise component estimation unit 11 or 41, the gain acquisition unit 12 or 42, and the gain application unit 19 or 49 that are used in the low frequency noise processing unit 56 may be the same as those described above or slightly modified according to needs.

The synthesis unit 57 may synthesize the signal o1 output from the high frequency noise processing unit 55 with the signal o2 output from the low frequency noise processing unit 56 and may acquire an output signal o.

The inverter 58 may invert the signal o output from the synthesis unit 57 and may generate a speech signal s. The inverter 58 may perform inversion of the signal o output to the synthesis unit 57 using an inverse fast Fourier transform (IFFT).

The acquired speech signal s may be transmitted to the output unit 59, such as a speaker, may be output to the outside or may be transmitted to a controller 61 of a device 60 to be controlled, such as a vehicle. The controller 61 may be configured of a separate microprocessor. The controller 61 may generate control instructions that correspond to the sound signal s, according to the speech signal s, may transmit the generated control instructions to a corresponding component in the device 60 to be controlled, and may control the device 60 to be controlled according to the user's sound instructions recognized by the sound recognition apparatus 50.

Hereinafter, a vehicle equipped with a sound recognition apparatus that uses an apparatus for eliminating noise will be described. Hereinafter, a general four-wheeled motor vehicle will be described as an example of a vehicle equipped with the sound recognition apparatus that uses the apparatus for eliminating noise. The four-wheeled motor vehicle may include a small car, a van, a bus or a truck that may drive with four wheels. Also, the vehicle equipped with the sound recognition apparatus that uses the apparatus for eliminating noise is not limited to the general four-wheeled motor vehicle. Examples of the vehicle equipped with the sound recognition apparatus may include a three-wheeled motor vehicle, a two-wheeled motor vehicle such as a motorcycle, a motorized bicycle, a construction machine, a bicycle, a train capable of traveling on railroad tracks, or a ship capable of navigating a waterway.

Figure 10:
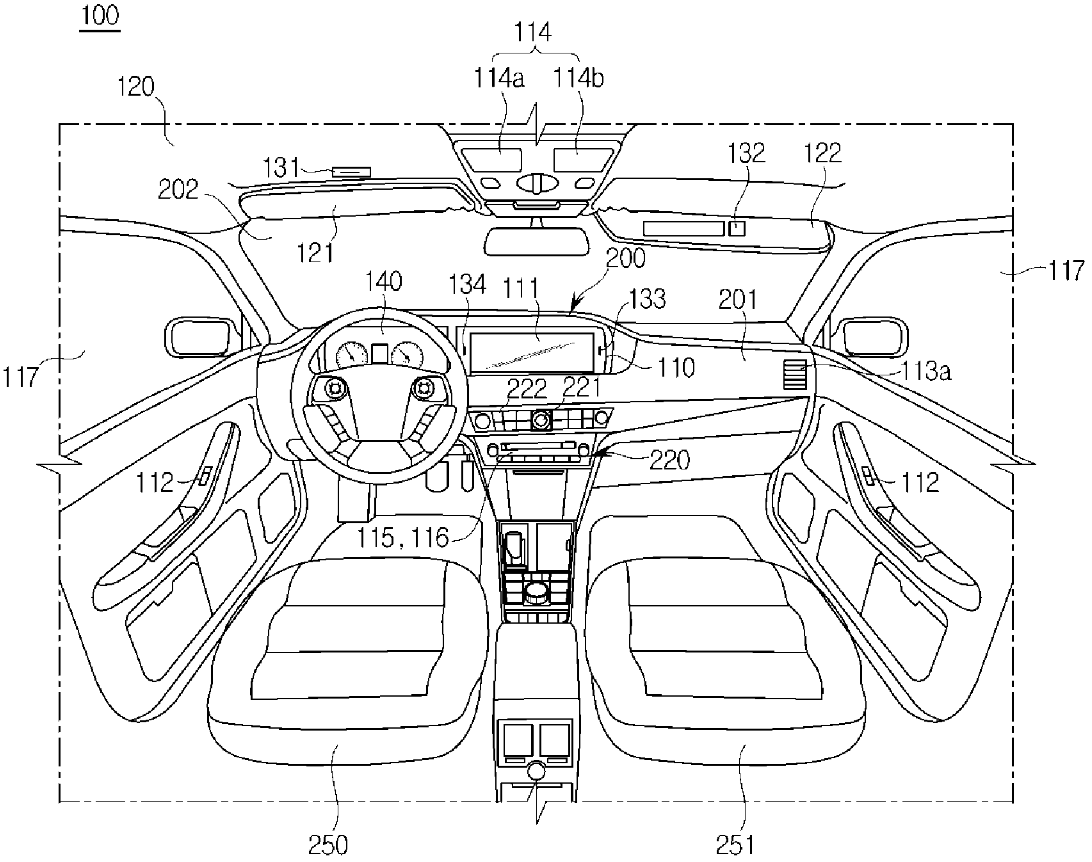
FIG. 10 is a view of an internal structure of a vehicle.

FIG. 10 is a view of an internal structure of a vehicle.

As illustrated in FIG. 10, a dashboard 200 may be disposed inside a vehicle 100. The dashboard 200 refers to a panel that partitions off an interior of the vehicle 100 and an engine compartment and is disposed in front of a driver's seat 250 and a passenger seat 251 and in which various components required for driving are installed. The dashboard 200 may include an upper panel 201, a center fascia 220, and a gearbox 230. The upper panel 201 of the dashboard 200 may be disposed under a windshield 202, and a tuyere 113*a* of an air conditioning device 113 and a glove box or various indicators 140 may be installed on the upper panel 201.

Also, a display device 110 for a vehicle, such as a navigation device, may be installed on the dashboard 200. In more detail, the display device 110 for the vehicle may be installed at a top end of the center fascia 220. The display device 110 for the vehicle may be buried in the dashboard 200 and may be installed at a top end of the center fascia 220 or may also be installed at the top end of the center fascia 220 using a supporting unit configured of a predetermined frame. One or two or more input units 133 and 134 for receiving the sound from a user, such as a driver or a passenger, may be disposed at a housing 111 of the display device 110 for the vehicle. The input units 133 and 134 may be implemented by a microphone.

The center fascia 220 (e.g., center console) of the dashboard 200 may be installed to be connected to the upper panel 201, and input units 221 and 222, such as physical buttons for controlling the vehicle, a radio device 116, or a sound reproduction device 115, such as a compact disc player, may be disposed at the center fascia 220 of the dashboard 200. The center fascia 220 may be disposed between the driver's seat 250 and the passenger seat 251.

In embodiments, various components including a microprocessor for controlling an electronic device in various vehicles including the display device 110 for the vehicle may be installed at an inner side of the dashboard 200. Various components may include at least one from among at least one semiconductor chip, at least one switch, at least one integrated circuit (IC), at least one resistor, at least one volatile or nonvolatile memory, and at least one printed circuit board (PCB), which perform a function of the microprocessor. The semiconductor chip, the switch, the IC, the resistor, and the volatile or nonvolatile memory may be disposed on the PCB.

One or two or more input units 131 for receiving the sound from the driver or the passenger may be disposed at an inner side of an upper frame of the vehicle 100. The input unit 131 may be implemented by a microphone. The input unit 131 may be electrically connected to the microprocessor that is disposed at the inner side of the dashboard 200 or the display device 110 for the vehicle 100 using a cable. Also, the input unit 131 may be electrically connected to the microprocessor disposed at the inner side of the dashboard 200 or the display device 110 for the vehicle 100 using a wireless communication network, such as Bluetooth or near field communication, and may transmit the sound received by the input unit 131 to the microprocessor.

Sun visors 121 and 122 may be installed at the inner side of the upper frame of the vehicle 100. One or two or more input units 132 for receiving the sound from the driver or the passenger may be disposed at the sun visors 121 and 122. The input unit 132 of the sun visors 121 and 122 may be implemented by the microphone. The input unit 132 of the sun visors 121 and 122 may be electrically connected to the microprocessor disposed at the inner side of the dashboard 200 or the display device 110 for the vehicle 100 in a wired or wireless manner and may transmit the sound signal received by the input unit 132 to the microprocessor. Also, a locking device 112 for locking a door 117 of the vehicle 100 may be disposed inside the vehicle 100.

Figure 11:
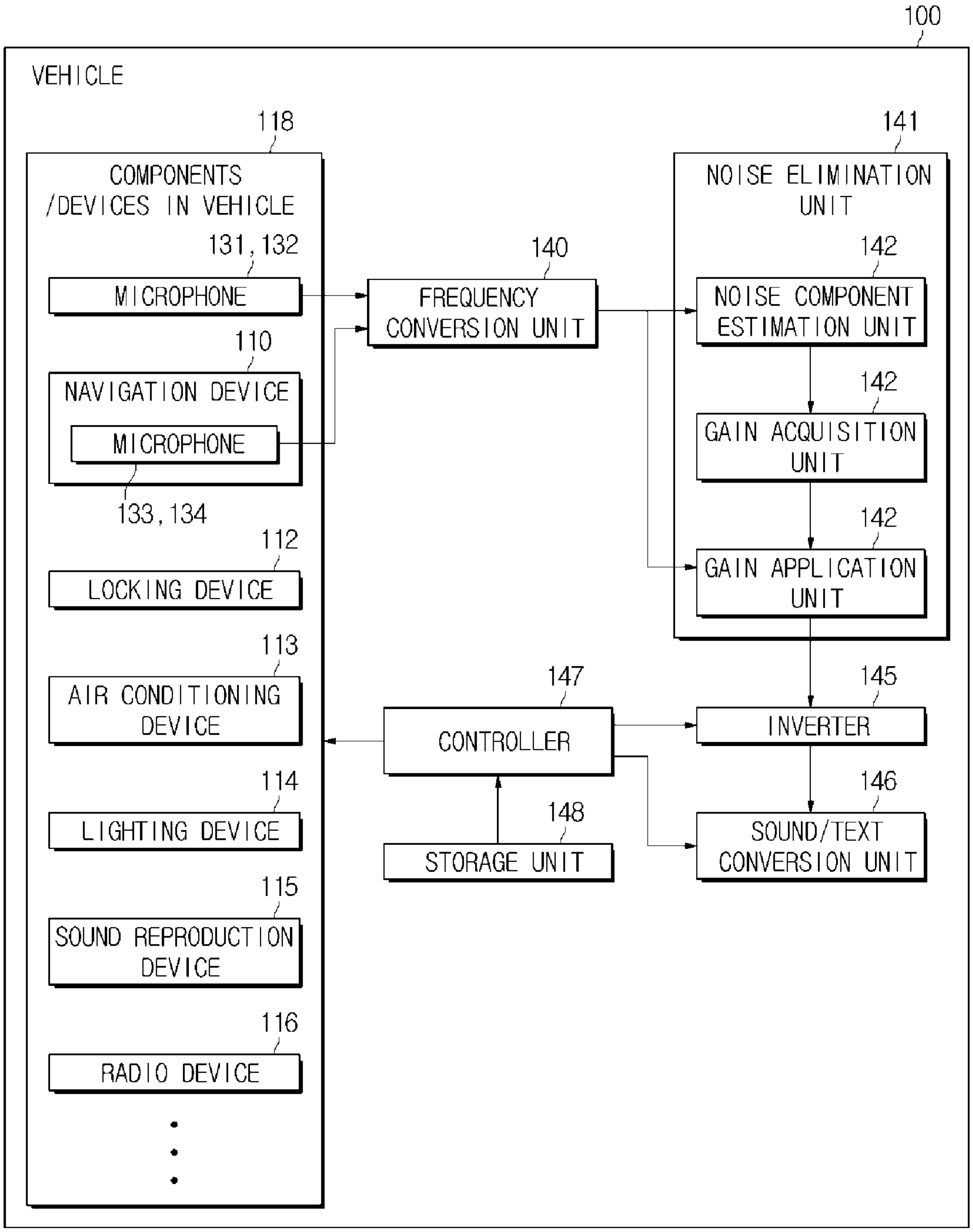
FIG. 11 is a block diagram of a sound recognition apparatus according to embodiments of the present disclosure installed in the vehicle.

FIG. 11 is a block diagram of a sound recognition apparatus according to embodiments of the present disclosure installed in the vehicle 100.

Referring to FIG. 11, the vehicle 100 may include various components and devices 118 in the vehicle 100 including microphones 131 through 134 installed inside the vehicle 100 or the navigation device 110, a frequency conversion unit 140, a noise elimination unit 141, an inverter 145, a sound/text conversion unit 146, a controller 147, and a storage unit 148.

Various components and devices 118 in the vehicle 100 may include various devices that may be used inside the vehicle 100 for driving or to provide the user with convenience, such as microphones 131 and 132, a navigation device 110, a locking device 112, an air conditioning device 113, a lighting device 114, the sound reproduction device 115, and the radio device 116, as illustrated in FIG. 11. The microphones 133 and 134 may be installed at the navigation device 110.

The microphones 131 through 134 may receive the driver's or passenger's sound and may output an electrical signal corresponding to the received sound. The output electrical signal may be an analog signal. The output electrical signal may be transmitted to the frequency conversion unit 140. The output electrical signal may be amplified by the amplifier or converted into a digital signal by the A/D converter before the output electrical signal is transmitted to the frequency conversion unit 140. The output electrical signal may include a signal in a time-domain.

The microphones 131 through 134 may receive the sound of the user who is the driver or the passenger, an engine sound of the vehicle 100, and various types of noise, such as a wind sound discharged from the tuyere 113*a* of the air conditioning device 113 or honks generated outside the vehicle 100. Thus, the electrical signal output from the microphones 131 through 134 may further include various noise signals together with signals relating to the user's sound.

The microphones 131 and 132 may be disposed at the inner side of the upper frame of the vehicle 100 or the sun visors 121 and 122, as illustrated in FIG. 10. In addition, the microphones 131 and 132 may be installed in various positions of the interior of the vehicle 100, such as on a steering handle. The positions in which the microphones 131 and 132 are installed may be positions in which the driver's or the passenger's sound is easily received. Furthermore, the microphones 133 and 134 may be previously installed in the navigation device 110.

The frequency conversion unit 140 may convert the signal in the time-domain into the signal in the frequency-domain, as described with reference to FIG. 9. The frequency conversion unit 140 may convert the signal in the time-domain into the signal in the frequency-domain using various methods including an FFT. The frequency conversion unit 140 may be omitted depending on embodiments.

The noise elimination unit 141 performs a function of eliminating noise from the signal in the frequency-domain in which the user's sound and noise inside the vehicle are mixed. The noise elimination unit 141 may include a noise component estimation unit 142, a gain acquisition unit 143, and a gain application unit 144.

The noise component estimation unit 142 may acquire estimated noise transmitted from the microphones 131 through 134 or the frequency conversion unit 140. The noise component estimation unit 142 may acquire the estimated noise by estimating the noise component using various algorithms that may be considered by one of ordinary skill in the art, such as an MCRA algorithm, an IMCRA algorithm, and a minimum statistics algorithm. In this case, the noise component estimation unit 142 may also estimate the noise component using the SPP.

The gain acquisition unit 143 may acquire an estimated SNR using the acquired estimated noise, may calculate and estimate a gain using the estimated SNR, may determine a correction value for correcting the estimated gain using the SNR, and may correct and output the estimated gain using the determined correction value.

The gain acquisition unit 143 may estimate the SNR using a method such as an MMSE, an RMS error, or a CMD. Also, the gain acquisition unit 143 may acquire the SPP and may also estimate the SNR using the acquired SPP.

The gain acquisition unit 143 may calculate the estimated gain using the estimated SNR. If necessary, the gain acquisition unit 143 may also calculate the estimated gain using the SPP. The gain acquisition unit 143 may estimate the gain using various methods that may be considered by one of ordinary skill in the art, such as an MMSE-STSA estimator, an MMSE-LSA estimator, or an OM-LSA estimator.

The gain acquisition unit 143 may determine the correction value for correcting the estimated gain using the estimated SNR. In this case, the gain acquisition unit 143 may acquire the correction value using the relationship between the correction value and the SNR or a predetermined set value. Here, the relationship between the correction value and the SNR may include several embodiments regarding the relationship between the correction value and the SNR that have been described with reference to FIGS. 3 through 5. The set value may be a value that indicates a selectable situation, and the selectable situation may include settings or performance of the sound recognition apparatus inside the vehicle. The lower limit value a1, a3 or a5 or the upper limit value a2, a4 or a6 of the relationship between the correction value and the SNR shown in FIGS. 3 through 5 may be changed according to a set value.

The correction value may be determined to be large when the SNR is large, i.e., when there is less noise, and the correction value may be determined to be small when the SNR is small, i.e., when there is more noise. Also, a correction value obtained when the sound recognition apparatus inside the vehicle recognizes the sound by reflecting driving noise of the vehicle (hereinafter referred to as a first correction value) may be relatively smaller than a correction value obtained when the sound recognition apparatus inside the vehicle recognizes the sound by not reflecting the driving noise of the vehicle, as in an external server or terminal equipment such as a smartphone (hereinafter referred to as a second correction value). In particular, the first correction value may be determined to be the same as the second correction value when the SNR is large, and the first correction value may be determined to be smaller than the second correction value.

The gain acquisition unit 143 may correct the estimated gain using the determined correction value. The gain acquisition unit 143 may correct the gain according to the above-described Equation 3.

The gain application unit 144 may acquire an output signal by applying the corrected estimated gain acquired by the gain acquisition unit 143 to a signal transmitted by the microphones 131 through 134 or the frequency conversion unit 140. The gain application unit 144 may acquire the output signal according to the above-described Equation 4.

In more detail, the gain acquisition unit 144 may increase the proportion of the signal of which noise is eliminated when the acquired correction value is closer to 1, and the gain acquisition unit 144 may increase the proportion of an original signal when the acquired correction value is closer to 0. Thus, if the sound recognition apparatus inside the vehicle recognizes the sound by reflecting the driving noise of the vehicle and the SNR of the sound signal is large, the correction value may be determined to be relatively small, and the gain acquisition unit 144 may synthesize the original signal with the signal of which noise is eliminated, so that the proportion of the original signal may be increased.

The signal output from the gain application unit 144 may be transmitted to the inverter 145. The inverter 145 may invert the signal output from the noise elimination unit 141 using IFFT, thereby generating a sound signal of which noise is eliminated. The signal output from the inverter 145 may be transmitted to the controller 147 via the sound/text conversion unit 146 or directly to the controller 147.

The sound/text conversion unit 146 may convert the sound into a text signal using various speech-to-text techniques and may transmit the converted text signal to the controller 147. If the controller 147 is able to generate control instructions directly using the sound signal, the sound/text conversion unit 146 may also be omitted.

The controller 147 may generate corresponding control instructions using the sound signal or the text signal converted by the sound/text conversion unit 146, may transmit the generated control instructions to corresponding components and devices to be controlled from among various components and devices 118 in the vehicle, thereby controlling the components and devices to be controlled. For example, when the driver gives sound instructions for lighting, the controller 147 may generate control signals corresponding to the sound instructions and then may transmit the generated control signals to the lighting device 114 and may turn on the lighting device 114.

The storage unit 148 may store various data required to generate control signals for the components and devices in the vehicle. If necessary, the storage unit 148 may also store a history regarding the control signals generated by the controller 147. The history regarding the control signals may also be used in learning of the sound recognition apparatus installed at the vehicle. In addition, the storage unit 168 may store various data or necessary settings.

The frequency conversion unit 140, the noise elimination unit 141, the inverter 145, the sound/text conversion unit 146, and the controller 147 described above may be implemented by a microprocessor installed in a particular position of the vehicle or the navigation device 110. The microprocessor may be implemented as one or two or more semiconductor chips. The frequency conversion unit 140, the noise elimination unit 141, the inverter 145, the sound/text conversion unit 146, and the controller 147 may also be implemented by only one microprocessor or a plurality of microprocessors that are physically separated from each other. The microprocessor may be programmed so as to perform functions of the frequency conversion unit 140, the noise elimination unit 141, the inverter 145, the sound/text conversion unit 146, and the controller 147.

Figure 12:
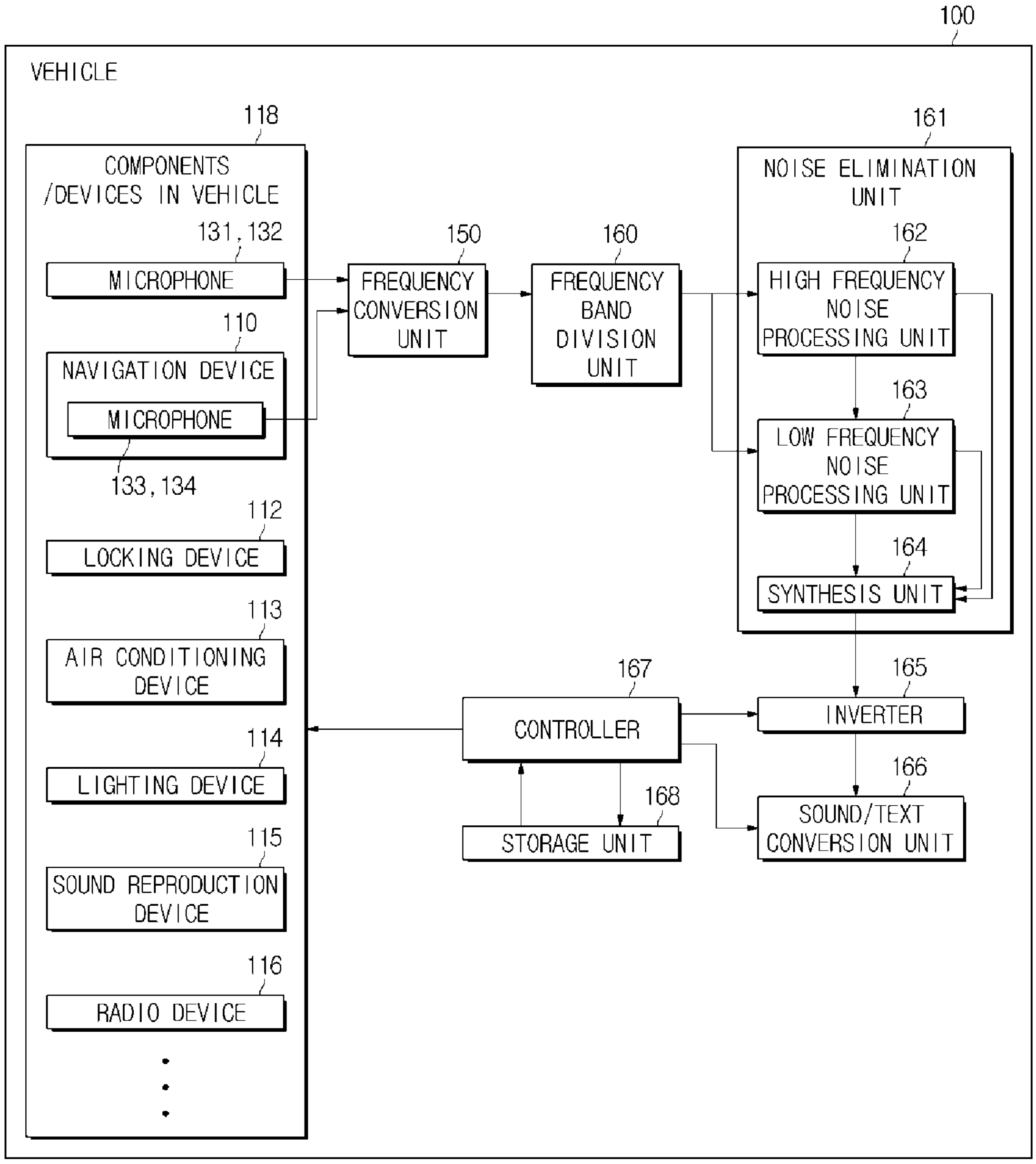
FIG. 12 is a block diagram of a sound recognition apparatus according to embodiments of the present disclosure installed in the vehicle.

FIG. 12 is a block diagram of a sound recognition apparatus according to embodiments of the present disclosure installed in the vehicle.

Referring to FIG. 12, a vehicle 100 may include various components and devices 118 in the vehicle 100 including microphones 131 through 134 installed in the vehicle 100, a frequency conversion unit 150, a frequency band division unit 160, a noise elimination unit 161, an inverter 165, a sound/text conversion unit 166, a controller 167, and a storage unit 168.

Various components and devices 118 in the vehicle 100 may include microphones 131 and 132, a navigation device 110, a locking device 112, an air conditioning device 113, a lighting device 114, a sound reproduction device 115, and a radio device 116, which are used for driving of the vehicle 100 or to provide a user with convenience, as illustrated in FIG. 12.

The microphones 131 through 134 may receive the driver's or the passenger's sound and may output an electrical signal corresponding to the received sound, as described with reference to FIG. 11. The output electrical signal may be an analog signal. The output electrical signal may be transmitted to the frequency conversion unit 150. The output electrical signal may be amplified by an amplifier or converted into a digital signal by an A/D converter before the output electrical signal is transmitted to the frequency conversion unit 150. The output electrical signal may include a signal in a time-domain. The microphones 131 through 134 may be installed in various positions of the vehicle 100, such as an inner side of an upper frame of the vehicle 100, sun visors 121 and 122, a steering handle or the navigation device 110.

The frequency conversion unit 150 may convert the signal in the time-domain into the signal in the frequency-domain, as described with reference to FIG. 9. The frequency conversion unit 150 may convert the signal in the time-domain into the signal in the frequency-domain using various methods including an FFT. The frequency conversion unit 150 may also be omitted depending on the embodiments. The frequency conversion unit 150 may be implemented by a microprocessor installed in a particular position in the vehicle 100 or in the navigation device 110.

The frequency band division unit 160 may divide the signal transmitted from the microphones 131 through 134 or the frequency conversion unit 150 into a signal having a high frequency component and a signal having a low frequency component using a predetermined reference value. Here, the predetermined reference value may be arbitrarily determined according to the designer's or the user's selection. The predetermined reference value may include 4 kHz, for example. The divided signal having the high frequency component and the signal having the low frequency component may be transmitted to the noise elimination unit 161.

The noise elimination unit 161 may include a high frequency noise processing unit 162, a low frequency noise processing unit 163, and a synthesis unit 164.

The signal having the high frequency component output from the frequency band division unit 160 may be transmitted to the high frequency noise processing unit 162, and the signal having the low frequency component may be transmitted to the low frequency noise processing unit 163.

The high frequency noise processing unit 162 may eliminate noise of the signal having the high frequency component. The high frequency noise processing unit 162 may eliminate the noise using a low resolution analysis algorithm. In more detail, the high frequency noise processing unit 162 may divide the signal having the high frequency component into relatively large frequency bands (see c1 through c3 of FIG. 7), may estimate only a noise component in each of the frequency bands (see c1 through c3 of FIG. 7), and may eliminate the noise in each of the frequency bands (see c1 through c3 of FIG. 7) of the signal having the high frequency component. The high frequency noise processing unit 162 may estimate the noise using an initial signal in which no sound is spoken by the user from among signals input through the microphones 131 through 134 and may eliminate the estimated noise from the signals input through the microphones 131 through 134. The initial signal may be configured of only noise, such as engine noise, or the main component of the initial signal may be noise. The high frequency noise processing unit 162 may calculate an average energy level from the initial signal for a predetermined period and may eliminate the calculated average energy level from the signals input through the microphones 131 through 134, thereby eliminating the noise. The high frequency noise processing unit 162 may eliminate the noise from the signal having the high frequency component using an algorithm, such as spectral subtraction or a Wiener filter. The signal of which the noise is eliminated by the high frequency noise processing unit 162 may be transmitted to the synthesis unit 164.

The low frequency noise processing unit 163 may eliminate noise of the signal having the low frequency component. In embodiments, the low frequency noise processing unit 163 may eliminate the noise according to the high resolution analysis algorithm. The low frequency noise processing unit 163 may divide the high frequency component into a plurality of frequency bands (see c4 through c10 of FIG. 7) so that each of the plurality of frequency bands (see c4 through c10 of FIG. 7) may be relatively narrow using the high resolution analysis algorithm and then may eliminate the noise in each of the frequency bands (see c4 through c10 of FIG. 7).

The low frequency noise processing unit 163 may estimate the noise component from the signal having the low frequency component using various algorithms that may be considered by one of ordinary skill in the art, such as an MCRA algorithm, an IMCRA algorithm, and a minimum statistics algorithm. The low frequency noise processing unit 163 may estimate the noise component in each of the frequency bands. Also, the low frequency noise processing unit 163 may also estimate the noise component using the above-described SPP.

The low frequency noise processing unit 163 may acquire an estimated SNR using the estimated noise, may calculate a gain using the estimated SNR, may determine a correction value for correcting the estimated gain using the SNR, and may correct the estimated gain using the determined correction value.

The low frequency noise processing unit 163 may estimate the SNR using a method such as an MMSE, an RMS error, or a CMD. Also, the low frequency noise processing unit 163 may acquire the SPP and may also estimate the SNR using the acquired SPP.

The low frequency noise processing unit 163 may acquire an estimated gain using the estimated SNR. The low frequency noise processing unit 163 may acquire the estimated gain using the estimated SNR and the SPP.

The low frequency noise processing unit 163 may determine a correction value for correcting the estimated gain using the relationship between the correction value and the SNR and a set value. The relationship between the correction value and the SNR may be given, as illustrated in FIGS. 3 through 5. For example, the correction value may be uniform in a predetermined range of the SNR and may have the relationship between the SNR and a linear function I1, an exponential function I2 or a log function I3 in a different range. The set value may be used to determine the relationship between the SNR and the correction value to be used to determine the correction value. The set value may include a value that indicates settings or performance of a sound recognition apparatus to which the apparatus 10 for eliminating noise may be applied.

The low frequency noise processing unit 163 may correct and output the above-described estimated gain using the determined correction value. Subsequently, the low frequency noise processing unit 163 may acquire an output signal by applying the corrected gain to the signal having the low frequency component and then may transmit the acquired output signal to the synthesis unit 164. Correcting the estimated gain and applying the signal having the low frequency component may be calculated according to Equations 3 and 4.

The synthesis unit 164 may synthesize the signal output from the high frequency noise processing unit 162 with the signal output from the low frequency noise processing unit 163 so as to acquire a synthesized signal and may transmit the synthesized signal to the inverter 165.

The inverter 165 may invert the signal output from the noise elimination unit 161 using an IFFT. Thus, a sound signal of which noise is eliminated may be acquired. The signal output from the inverter 165 may be transmitted to the controller 167 via the sound/text conversion unit 166 or directly to the controller 167 without passing through the sound/text conversion unit 166.

The sound/text conversion unit 166 may convert the sound signal into a text signal using various speech-to-text techniques and may transmit the converted text signal to the controller 167. If the controller 167 is able to generate control instructions directly using the sound signal, the sound/text conversion unit 166 may also be omitted.

The controller 167 may generate control instructions corresponding to the user's sound using the sound signal of which noise is eliminated, or the text signal, may transmit the generated control instructions to corresponding components and devices to be controlled from among various components and devices 118 in the vehicle 100, thereby controlling the components and devices to be controlled.

The storage unit 168 may store various data required to generate control signals for various components and devices 118 in the vehicle 100 using the controller 167 or a history regarding the control signals generated by the controller 167. In addition, the storage unit 168 may store various data or settings.

The frequency conversion unit 150, the frequency band division unit 160, the noise elimination unit 161, the inverter 165, the sound/text conversion unit 166, and the controller 167 described above may be implemented by a microprocessor installed in a particular position in the vehicle 100 or in the navigation device 110.

The microprocessor may be implemented by one or two or more semiconductor chips. The frequency conversion unit 150, the frequency band division unit 160, the noise elimination unit 161, the inverter 165, the sound/text conversion unit 166, and the controller 167 may be implemented using only one microprocessor or using two or more microprocessors that are physically separated from each other.

Hereinafter, a method of eliminating noise according to embodiments of the present disclosure will be described with reference to FIGS. 13 and 14.

Hereinafter, the method of eliminating noise that may be used in a sound recognition apparatus will be described. However, the method of eliminating noise is not performed by only the sound recognition apparatus. The method of eliminating noise may be used in various apparatuses that are required to eliminate noise. Also, the following sound recognition apparatus may be a sound recognition apparatus that is used in a three-wheeled or four-wheeled motor vehicle, a two-wheeled vehicle such as a motorcycle, a motorized bicycle, a construction machine, a bicycle, a train capable of traveling on railroad tracks, or a ship capable of navigating a waterway, as described above. However, embodiments of the present disclosure are not limited thereto. For example, a cellular phone, a personal digital assistant apparatus, a smartphone, a tablet personal computer (PC), a notebook computer, a navigation device or portable terminal equipment may also be an example of the sound recognition apparatus that uses the method of eliminating noise that will be described later. In addition, various types of devices that may be considered by one of ordinary skill in the art may be examples of the sound recognition apparatus that uses the method of eliminating noise that will be described later.

Figure 13:
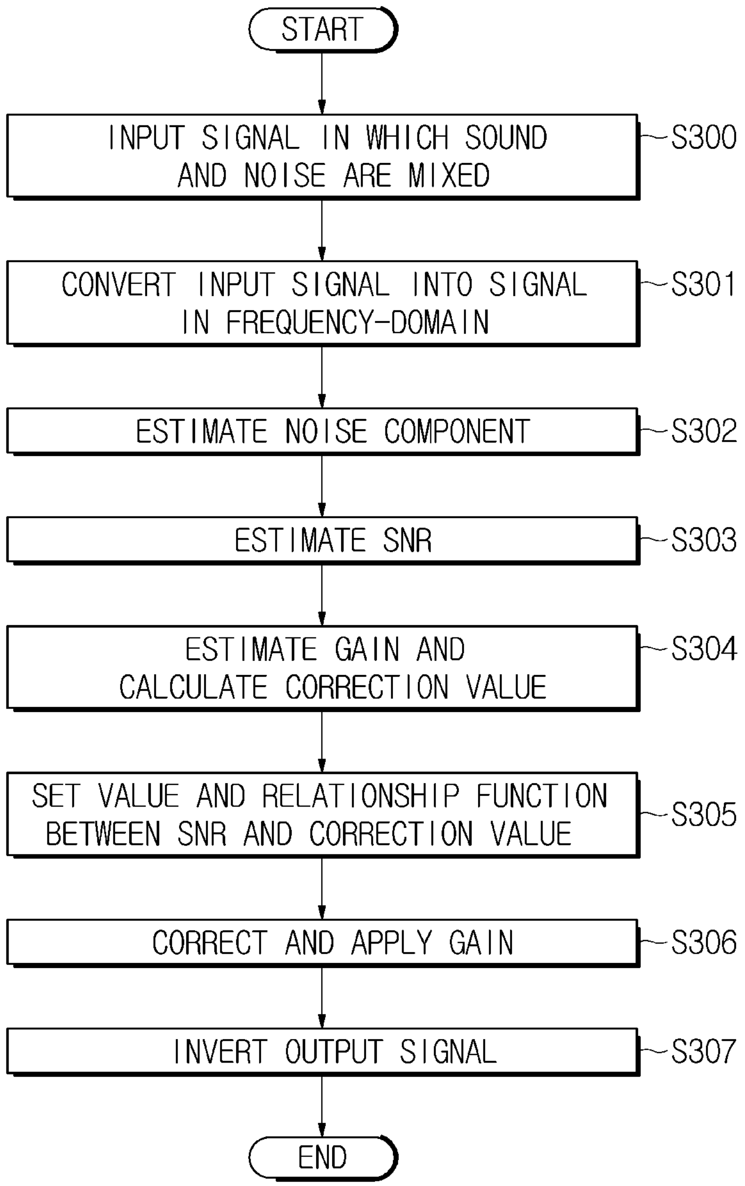
FIG. 13 is a flowchart of a method of eliminating noise according to embodiments of the present disclosure.

FIG. 13 is a flowchart of a method of eliminating noise according to embodiments of the present disclosure.

Referring to FIG. 13, first, a signal in which a sound and noise are mixed may be input through a microphone (S300). The input signal may be amplified by an amplifier or converted into a digital signal by an A/D converter. The input signal may be a signal in a time-domain. In this case, the signal in the time-domain may be converted into a signal in a frequency-domain (S301). Conversion of the input signal into the frequency-domain may be performed using an FFT. The operation of converting the input signal into the signal in the frequency-domain may be omitted depending on the embodiments.

Subsequently, a noise component may be estimated from the input signal (S302). When the input signal is divided into a plurality of frequency bands, the noise component may be separately estimated in each of the plurality of frequency bands divided.

If the noise component is estimated, an SNR may be acquired or estimated using the estimated noise component (S303). The SNR or an estimated SNR may be acquired in each of the plurality of divided frequency bands. The SNR may be estimated using an MMSE, an RMS error, or a CMD. Also, the SNR may be estimated using an SPP.

If the SNR is acquired, a gain may be estimated using the SNR, and a correction value to be applied to the gain may be calculated (S304). Estimating the gain may be performed using an MMSE-STSA estimator, an MMSE-LSA estimator, or an OD-LSA estimator. The correction value may be determined using the relationship between the correction value and the SNR and the set value that have been described with reference to FIGS. 3 through 5 (S305).

The relationship between the correction value and the SNR may be set so that the correction value increases as the SNR increases. The relationship between the correction value and the SNR may also be set so that the correction value is uniform when the SNR is in a predetermined range.

The set value is a value that indicates a selectable situation, and the relationship between the correction value and the SNR may be changed according to the set value. Changing the relationship between the correction value and the SNR may be performed by changing a relationship function that indicates the relationship between the correction value and the SNR or by changing at least one of an upper limit value and a lower limit value of the selectable correction value. Here, the relationship function that indicates the relationship between the correction value and the SNR may have a shape of a linear function, an exponential function or a log function in a particular section, as illustrated in FIGS. 3 through 5.

If the gain and the correction value are acquired, the gain may be corrected by applying the correction value to the gain, and an output signal may be acquired by applying the corrected gain to an input signal (S306). In embodiments, when the correction value is 1 or a value that is close to 1, the proportion of the signal of which the noise is eliminated in the output signal may be further increased, and when the correction value is a value that is close to 0, the proportion of the signal which is originally input and of which noise is not eliminated in the output signal may be further increased.

The output signal may be inverted using an IFFT (S307). A signal having a sound corresponding to the output signal may be acquired using an IFFT. The signal having the acquired sound may be a signal of which the noise is eliminated, a signal of which the noise is not eliminated, or a signal of which a part of the noise is eliminated, depending on the correction value.

Figure 14:
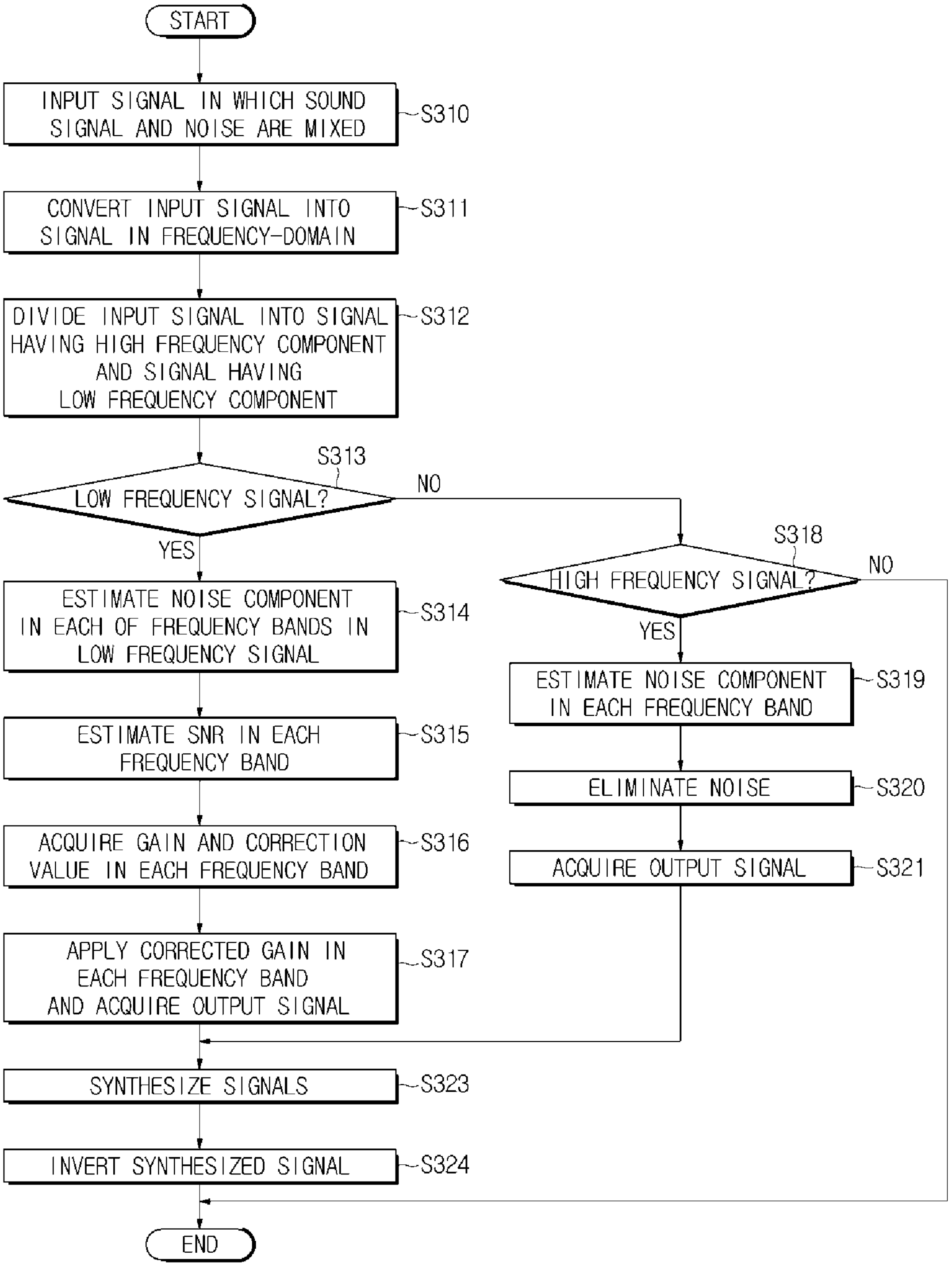
FIG. 14 is a flowchart of a method of eliminating noise according to embodiments of the present disclosure.

FIG. 14 is a flowchart of a method of eliminating noise according to embodiments of the present disclosure.

Referring to FIG. 14, first, a signal in which a sound and noise are mixed may be input through a microphone (S310). The input signal in which the sound and the noise are mixed may be amplified by an amplifier or converted into a digital signal by an A/D converter.

The input signal may be a signal in a time-domain. In this case, the signal in the time-domain may be converted into a signal in a frequency-domain (S311). Conversion of the input signal into the signal in the frequency-domain may also be performed using an FFT. The operation of converting the input signal into the signal in the frequency-domain may be omitted depending on the embodiments.

The input signal may be divided into a signal having a high frequency component and a signal having a low frequency component depending on a predetermined reference value (S312). Here, the predetermined reference value may be 4 kHz. However, embodiments of the present disclosure are not limited thereto. The reference value may be arbitrarily determined or changed according to the designer's or the user's selection.

Noise of the signal having the high frequency component and noise of the signal having the low frequency component may both be eliminated using the same method or may be eliminated using different methods.

When the noise of the signal having the high frequency component and the noise of the signal having the low frequency component are eliminated using different methods, the noise of the signal having the low frequency component (S313) may be eliminated by estimating a noise component (S314), estimating an SNR (S315), acquiring an estimated gain and a correction value (S316), and correcting the gain and acquiring an output signal (S317).

In embodiments, the noise of the signal having the low frequency component may be eliminated using a high resolution analysis algorithm. When the high resolution analysis algorithm is used to eliminate the noise of the signal having the low frequency component, the noise component may be estimated in each of frequency bands that are obtained by dividing the signal having the low frequency component (S314).

If the noise component is estimated, an SNR may be acquired in each of the divided frequency bands using the estimated noise component (S315). The SNR may be estimated using an MMSE, an RMS error, or a CMD and by further using an SPP if necessary.

If the SNR is acquired, the gain may be estimated using the SNR, and a correction value to be applied to the gain may be calculated (S316). Estimating the gain may be performed using an MMSE-STSA estimator, an MMSE-LSA estimator, or an OD-LSA estimator. The correction value may be determined using the relationship between the correction value and the SNR and the set value that have been described with reference to FIGS. 3 through 5.

The relationship between the correction value and the SNR may be set in such a way that the correction value increases as the SNR increases. The relationship between the correction value and the SNR may also be set in such a way that the correction value is uniform when the SNR is in a predetermined range.

The relationship between the correction value and the SNR may be changed according to the set value. Changing the relationship between the correction value and the SNR may be performed by changing a relationship function that indicates the relationship between the correction value and the SNR or by changing at least one of an upper limit value and a lower limit value of a selectable correction value. The relationship function that indicates the relationship between the correction value and the SNR may have a shape of a linear function, an exponential function, or a log function in a particular section, as illustrated in FIGS. 3 through 5.

If the gain and the correction value are acquired, the gain may be corrected by applying the correction value to the gain, and an output signal may be acquired by applying the corrected gain to the input signal (S317). The correction value may be set in such a way that, as described above, the proportion of a signal of which noise is eliminated in the output signal may be further increased when the correction value is 1 or a value that is close to 1, and the proportion of a signal which is originally input and of which noise is not eliminated in the output signal may be further increased when the correction value is a value that is close to 0.

Noise of a signal having a high frequency component (S318) may be eliminated by estimating a noise component (S319), eliminating noise (S320), and acquiring an output signal (S321). In embodiments, the noise of the signal having the high frequency component may be eliminated using a low resolution analysis algorithm.

When the low resolution analysis algorithm is used to estimate the noise of the signal having the high frequency component, a noise component may be estimated in each of frequency bands that are obtained by dividing the signal having the high frequency component (S319). In embodiments, an initial signal for a predetermined period or an average energy level calculated from the initial signal may be estimated as the noise.

Subsequently, the noise may be eliminated from the signal having the high frequency component using the estimated noise component (S320). In this case, the noise may be eliminated in each of the frequency bands. Eliminating the noise may be performed using spectral subtraction or a Wiener filter. As a result, an output signal that is a signal having the high frequency component of which noise is eliminated may be acquired (S321).

If the signal having the low frequency component of which noise is eliminated and the signal having the high frequency component of which noise is eliminated are acquired, the acquired signals may be synthesized with each other (S323). The synthesized signal may be inverted using various inversion methods including an IFFT (S324). A signal having a sound corresponding to the signal synthesized by an IFFT may be acquired.

The above-described method of eliminating noise may be implemented using one or two or more codes, and these codes may be programmed by a microprocessor in the apparatus for eliminating noise so as to implement the method of eliminating noise. Also, the codes for implementing the above-described method of eliminating noise may be encoded and executed by a computer. These codes may be recorded in a storage medium, such as a compact disc storage device, a semiconductor storage device, or a magnetic disk storage device.

As described above, in an apparatus and method for eliminating noise, a sound recognition apparatus using the apparatus and a vehicle equipped with the sound recognition apparatus according to embodiments of the present disclosure, a sound generated by a user speaking can be more precisely recognized with a relatively small amount of calculation even when there is much noise, and thus sound recognition performance can be improved.

In addition, in an apparatus and method for eliminating noise, a sound recognition apparatus using the apparatus and a vehicle equipped with the sound recognition apparatus according to embodiments of the present disclosure, the user's sound can be clearly recognized even when there is much noise, such as engine noise, so that components inside a vehicle can be controlled according to the user's intention and thus reliability of the sound recognition apparatus can be improved. Furthermore, user convenience can be improved, and safer driving of the vehicle can be performed.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus for eliminating noise, comprising:

a gain acquisition unit that determines a gain and a correction value of the gain using a signal to noise ratio (SNR) of an input signal; and a gain application unit that acquires an output signal corresponding to the input signal using the determined gain and the determined correction value, wherein the output signal includes an input signal of which noise is eliminated and an input signal of which noise is not eliminated, and a proportion of the input signal of which noise is eliminated and a proportion of the input signal of which noise is not eliminated are determined according to the determined correction value.

2. The apparatus of claim 1, wherein the gain acquisition unit determines the correction value of the gain based on the SNR of the input signal.

3. The apparatus of claim 2, wherein the gain acquisition unit determines the correction value of the gain based further on a set value associated with a relationship between the SNR of the input signal and the correction value, and changes the relationship between the SNR of the input signal and the correction value based on the set value, wherein the set value indicates a performance of a sound recognition apparatus.

4. The apparatus of claim 1, wherein the correction value is determined in such a way that the correction value increases as the SNR of the input signal increases, or that the correction value has a uniform value when the SNR of the input signal is less than a first value or is greater than a second value.

5. The apparatus of claim 1, wherein the correction value is determined in such a way that the proportion of the input signal of which noise is eliminated increases when the SNR of the input signal increases, while the proportion of the input signal of which noise is not eliminated increases when the SNR of the input signal decreases.

6. The apparatus of claim 1, further comprising:

a noise component estimation unit that estimates noise of the input signal using at least one of a minima controlled recursive averaging (MCRA) algorithm, an improved minima controlled recursive averaging (IMCRA) algorithm, and a minimum statistics algorithm.

7. The apparatus of claim 1, further comprising:

a SNR estimation unit that estimates the SNR of the input signal using at least one of a minimum mean square error (MMSE), a root mean square (RMS) error, a cumulative minimum distance (CMD), and a speech presence probability (SPP).

8. A sound recognition apparatus comprising:

an input unit that receives a sound signal in which an original signal and noise are mixed;

a conversion unit that converts the sound signal into a signal in a frequency-domain;

a gain acquisition unit that determines a gain and a correction value of the gain using a signal to noise ratio (SNR) of the sound signal and acquires a corrected gain obtained by applying the determined correction value to the determined gain;

a gain application unit that acquires an output signal by applying the corrected gain to the sound signal, wherein a proportion of the input signal of which noise is eliminated in the output signal and a proportion of the input signal of which noise is not eliminated in the output signal are changed according to the determined correction value; and an inverter that inverts the output signal.

9. A vehicle comprising:

an input unit that receives a sound signal from a passenger of the vehicle in which sound instructions and noise are mixed together;

a sound recognition unit that recognizes sound instructions by: i) converting the received sound signal into a signal in a frequency-domain, ii) determining a gain and a correction value of the gain using a signal to noise ratio (SNR) of the signal in the frequency-domain, iii) acquiring an output signal by applying a corrected gain obtained by applying the determined correction value to the determined gain, and iv) inverting the output signal, wherein a proportion of the received sound signal of which noise is eliminated in the output signal and a proportion of the received sound signal of which noise is not eliminated in the output signal are changed based on the determined correction value; and a controller that generates a control signal based on the recognized sound instructions.

10. A method of eliminating noise, comprising:

determining a gain and a correction value of the gain using a signal to noise ratio (SNR) of an input signal;

acquiring a corrected gain obtained by applying the determined correction value to the determined gain; and acquiring an output signal by applying the corrected gain to the input signal, wherein a proportion of an input signal of which noise is eliminated in the output signal and a proportion of the input signal of which noise is not eliminated in the output signal are changed based on the determined correction value.

11. The method of claim 10, wherein the determining of the correction value of the gain comprises:

determining the correction value of the gain based on a relationship between the SNR of the input signal and the correction value.

12. The method of claim 10, wherein the determining of the correction value of the gain comprises:

determining the correction value of the gain based further on a set value associated with a relationship between the SNR of the input signal and the correction value.

13. The method of claim 10, wherein the correction value is determined in such a way that the correction value increases as the SNR of the input signal increases, or the correction value has a uniform value when the SNR of the input signal is less than a first value or is greater than a second value.

14. The method of claim 10, wherein the correction value is determined in such a way that the proportion of the input signal of which noise is eliminated increases when the SNR of the input signal increases, while the proportion of the input signal of which noise is not eliminated increases when the SNR of the input signal decreases.

15. The method of claim 10, further comprising:

estimating noise of the input signal using at least one of a minima controlled recursive averaging (MCRA) algorithm, an improved minima controlled recursive averaging (IMCRA) algorithm, and a minimum statistics algorithm.

16. The method of claim 10, further comprising:

estimating the SNR of the input signal using at least one of a minimum mean square error (MMSE), a root mean square (RMS) error, a cumulative minimum distance (CMD), and a speech presence probability (SPP).

* * * * *